US012668255B2

(12) United States Patent
Kim et al.

(10) Patent No.: US 12,668,255 B2
(45) Date of Patent: Jun. 30, 2026

(54) SIGNAL PROCESSING DEVICE AND VEHICLE DISPLAY APPARATUS INCLUDING THE SAME

(71) Applicant: LG ELECTRONICS INC., Seoul (KR)

(72) Inventors: Minkyu Kim, Seoul (KR); Woojin Sim, Seoul (KR); Jinman Joo, Seoul (KR); Youngkyung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/876,871

(22) PCT Filed: Oct. 23, 2023

(86) PCT No.: PCT/KR2023/016467
§ 371 (c)(1),
(2) Date: Dec. 19, 2024

(87) PCT Pub. No.: WO2025/089431
PCT Pub. Date: May 1, 2025

(65) Prior Publication Data
US 2026/0001566 A1 Jan. 1, 2026

(51) Int. Cl.
*B60W 50/029* (2012.01)
*B60W 30/12* (2020.01)
(Continued)

(52) U.S. Cl.
CPC ...... *B60W 50/029* (2013.01); *B60W 50/0225* (2013.01); *B60W 50/023* (2013.01);
(Continued)

(58) Field of Classification Search
CPC .......... B60W 50/029; B60W 50/0225; B60W 50/023; B60W 50/14; B60W 30/12;
(Continued)

(56) References Cited

U.S. PATENT DOCUMENTS 3,812,468 A * 5/1974 Wollum .............. G06F 11/2035
714/E11.015
4,649,484 A * 3/1987 Herzog ................. B64C 13/505
244/230

(Continued)

FOREIGN PATENT DOCUMENTS

KR 10-2019-0027966 A 3/2019
KR 10-2020-0110229 A 9/2020

*Primary Examiner* — Dale W Hilgendorf
(74) *Attorney, Agent, or Firm* — Birch, Stewart, Kolasch & Birch, LLP

(57) ABSTRACT

A signal processing device and a vehicle display apparatus including the same according to an embodiment of the present disclosure include: at least one neural processor; and a central processor configured to execute an application for driving a vehicle, wherein the central processor is configured to: in response to determination of operation failure of the application, execute a second application, corresponding to the application, in another central processor or another signal processing device, and based on a safety level of the application, change a reference fallback guarantee time for the operation failure of the application. Accordingly, the application for driving the vehicle may be stably executed.

18 Claims, 16 Drawing Sheets

(51) Int. Cl.

| | |
|---|---|
| *B60W 30/18* | (2012.01) |
| *B60W 50/00* | (2006.01) |
| *B60W 50/02* | (2012.01) |
| *B60W 50/023* | (2012.01) |
| *B60W 50/14* | (2020.01) |

(52) U.S. Cl.
CPC ............. *B60W 50/14* (2013.01); *B60W 30/12* (2013.01); *B60W 30/18163* (2013.01); *B60W 2050/0031* (2013.01); *B60W 2050/0292* (2013.01); *B60W 2050/146* (2013.01)

(58) Field of Classification Search
CPC ... B60W 30/18163; B60W 2050/0031; B60W 2050/0292; B60W 2050/146
See application file for complete search history.

(56) References Cited

U.S. PATENT DOCUMENTS

| | | | | |
|---|---|---|---|---|
| 5,493,497 | A * | 2/1996 | Buus | G05D 1/0077 |
| | | | | 701/4 |
| 5,579,219 | A * | 11/1996 | Mori | G05B 19/0421 |
| | | | | 701/115 |
| 6,463,373 | B2 | 10/2002 | Suganuma | B60W 50/029 |
| | | | | 701/48 |
| 7,146,260 | B2 * | 12/2006 | Preston | G06F 11/2035 |
| | | | | 340/3.1 |
| 8,380,383 | B2 * | 2/2013 | Preston | G06F 11/2046 |
| | | | | 701/24 |
| 9,977,432 | B1 * | 5/2018 | Cutler | G05D 1/101 |
| 10,901,434 | B2 * | 1/2021 | Cutler | G05D 1/101 |
| 11,435,761 | B1 * | 9/2022 | Wiegman | G05D 1/0077 |
| 11,829,160 | B2 * | 11/2023 | Cutler | G05D 1/2272 |
| 12,204,335 | B2 * | 1/2025 | Lavrenyuk | G05D 1/0055 |
| 12,228,946 | B2 * | 2/2025 | Cutler | G05D 1/495 |
| 2006/0043242 | A1 * | 3/2006 | Benson | B64C 13/503 |
| | | | | 244/175 |
| 2007/0007385 | A1 * | 1/2007 | Potter | B64C 13/505 |
| | | | | 244/53 R |
| 2007/0153433 | A1 * | 7/2007 | Sundquist | H02P 29/64 |
| | | | | 361/25 |
| 2008/0203224 | A1 * | 8/2008 | Yount | B64C 13/42 |
| | | | | 244/99.5 |
| 2012/0204059 | A1 * | 8/2012 | Preston | H04L 67/125 |
| | | | | 712/30 |
| 2012/0290153 | A1 * | 11/2012 | Olsoe | G05D 1/0077 |
| | | | | 701/3 |
| 2013/0151894 | A1 * | 6/2013 | Honda | G06F 11/079 |
| | | | | 714/17 |
| 2013/0318310 | A1 * | 11/2013 | Yamauchi | G06F 11/3471 |
| | | | | 711/151 |
| 2015/0012154 | A1 * | 1/2015 | Senkel | B64D 11/0689 |
| | | | | 701/4 |
| 2018/0052747 | A1 * | 2/2018 | Castagna | H04L 67/142 |
| 2018/0297712 | A1 * | 10/2018 | Oldroyd | B64U 10/20 |
| 2019/0031338 | A1 * | 1/2019 | McCullough | G05D 1/0808 |
| 2021/0146938 | A1 | 5/2021 | Sari | |
| 2021/0163021 | A1 * | 6/2021 | Frazzoli | B60W 50/023 |
| 2021/0232103 | A1 * | 7/2021 | Hull | G05D 1/854 |
| 2021/0300392 | A1 * | 9/2021 | Shionome | G01S 13/867 |
| 2025/0360963 | A1 * | 11/2025 | Lavole | B62D 15/0265 |

* cited by examiner

Figure 12:
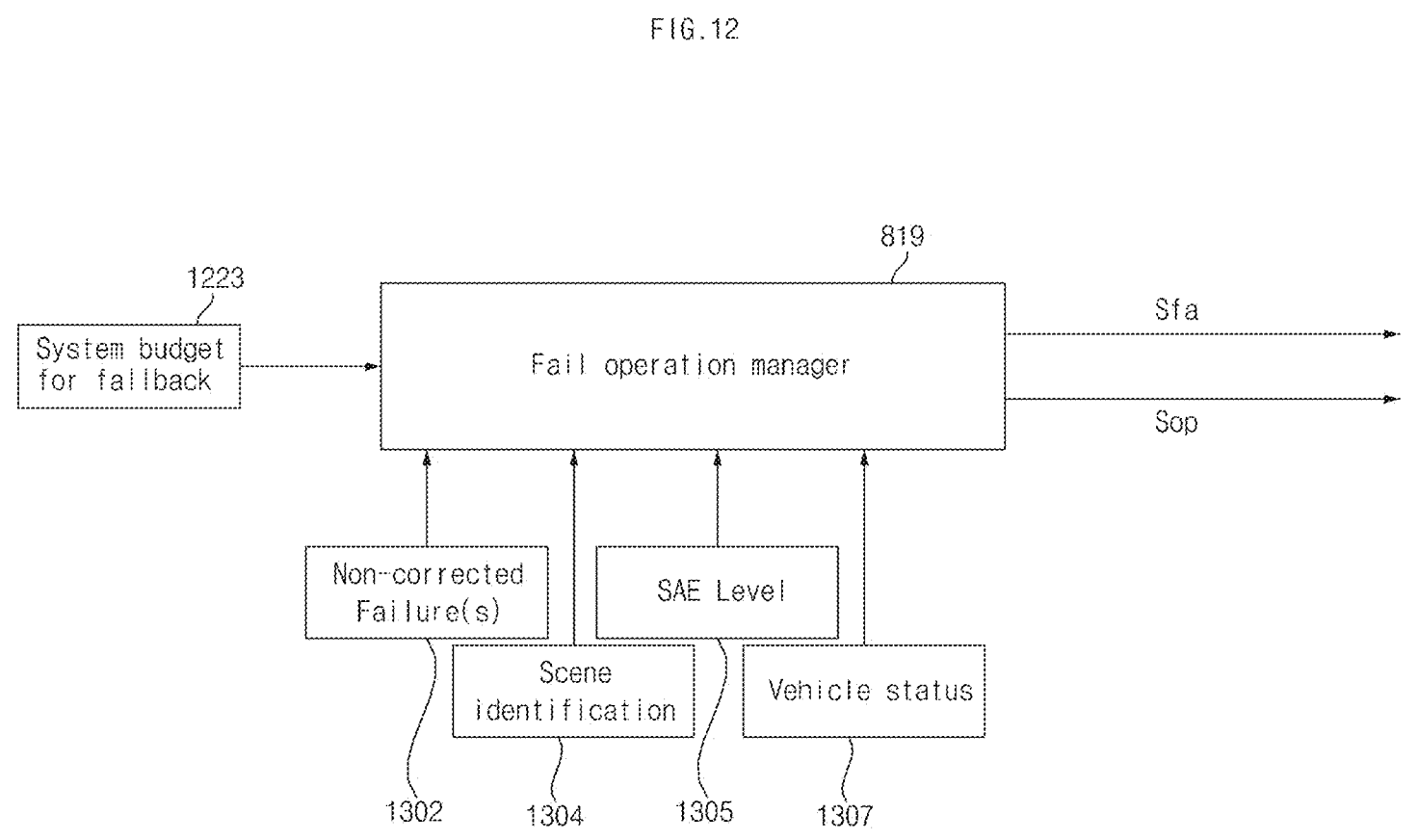

Sfa

Sop

819

Fail operation manager

System budget for fallback

1223

Non-corrected Failure(s)

1302

Scene identification

1304

SAE Level

1305

Vehicle status

| Fall back | |
|---|---|
| S0 | Blind brake |
| S1 | Lane keep |
| S2 | Emergency Lane change |
| . . . | |

SIGNAL PROCESSING DEVICE AND VEHICLE DISPLAY APPARATUS INCLUDING THE SAME

CROSS REFERENCE TO RELATED APPLICATIONS

This application is the National Phase of PCT/KR2023/016467 filed on Oct. 23, 2023, which is hereby expressly incorporated by reference into the present application.

TECHNICAL FIELD

The present disclosure relates to a signal processing device and a vehicle display apparatus including the same, and more particularly to a signal processing device capable of stably executing an application for driving a vehicle, and a vehicle display apparatus including the signal processing device.

DESCRIPTION OF THE RELATED ART

A vehicle is a machine that allows a user to move in a desired direction. A typical example of the vehicle is an automobile.

Meanwhile, a signal processing device for vehicles is mounted in the vehicle for convenience of users who use the vehicle.

Meanwhile, the signal processing device for vehicles may execute various applications for driving a vehicle.

For example, the signal processing device for vehicles may execute Advanced Driver Assistance System (ADAS) applications or automatic driving (AD) applications, and the like.

Meanwhile, various failures may occur in the vehicle during execution of the applications for driving a vehicle, such that research is being conducted on methods for stably controlling the vehicle when failures occur.

SUMMARY

It is an objective of the present disclosure to provide a signal processing device capable of stably executing an application for driving a vehicle, and a vehicle display apparatus including the signal processing device.

Meanwhile, it is another objective of the present disclosure to provide a signal processing device capable of stably executing an application for driving a vehicle based on a safety level, and a vehicle display apparatus including the signal processing device.

In accordance with an aspect of the present disclosure, the above and other objectives can be accomplished by providing a signal processing device and a vehicle display apparatus including the same, which include: at least one neural processor; and a central processor configured to execute an application for driving a vehicle, wherein the central processor is configured to: in response to determination of operation failure of the application, execute a second application, corresponding to the application, in another central processor or another signal processing device, and based on a safety level of the application, change a reference fallback guarantee time for the operation failure of the application.

Meanwhile, the central processor may be configured to: in response to the safety level of the application being a first safety level, set the reference fallback guarantee time to a first time; and in response to the safety level of the application being a second safety level higher than the first safety level, set the reference fallback guarantee time to a second time longer than the first time.

Meanwhile, in response to the safety level of the application being a third safety level lower than the first safety level, the central processor may be configured to set the reference fallback guarantee time to a third time shorter than the first time.

Meanwhile, in response to a calculated fallback guarantee time being greater than or equal to the reference fallback guarantee time, the central processor may be configured to perform a predetermined operation.

Meanwhile, in response to a calculated fallback guarantee time being less than the reference fallback guarantee time, the central processor may be configured to execute the second application, corresponding to the application, in another central processor or another signal processing device.

Meanwhile, in response to a calculated fallback guarantee time being less than the reference fallback guarantee time, the central processor may be configured to perform a fallback operation.

Meanwhile, in response to a calculated fallback guarantee time being less than the reference fallback guarantee time, the central processor may be configured to perform one of a plurality of fallback operations.

Meanwhile, the plurality of fallback operations may include driver takeover request, blind brake, Lane Keeping and Blind Braking, Emergency lane change and braking, Pull over on a shoulder, or long distance route planning.

Meanwhile, in a state in which a calculated fallback guarantee time is greater than the reference fallback guarantee time and the calculated fallback guarantee time is reduced, as a difference between the calculated estimated reference fallback guarantee time and the reference fallback guarantee time decreases, the central processor may be configured to restrict execution of an application with a higher safety level.

Meanwhile, the central processor may be configured to: in response to a difference between the calculated estimated reference fallback guarantee time and the reference fallback guarantee time being a first time, execute an application corresponding to the first safety level; and in response to a difference between the calculated estimated reference fallback guarantee time and the reference fallback guarantee time being a second time greater than the first time, execute an application corresponding to a second safety level higher than the first safety level.

Meanwhile, the central processor may be configured to change the reference fallback guarantee time based on a driving environment of the vehicle.

Meanwhile, the central processor may be configured to calculate a fallback guarantee time based on at least one of temperature of a system, performance based on the safety level, an error history of the system, latency of the application or workload of the system.

Meanwhile, the neural processor may be configured to perform neural processing based on at least one of the temperature of the system, the performance based on the safety level, the error history of the system, the latency of the application or the workload of the system, and to calculate a fallback guarantee time based on the neural processing.

Meanwhile, the neural processor may be configured to perform neural processing based on a feedback on power data or temperature data in result data of the neural processing.

Meanwhile, the central processor may be configured to execute a hypervisor and a plurality of virtual machines on the hypervisor, wherein a first virtual machine among the plurality of virtual machines may be configured to execute a neural system service for controlling the neural processor.

Meanwhile, a second virtual machine among the plurality of virtual machines may be configured to execute an ADAS application, and a third virtual machine among the plurality of virtual machines may be configured to execute a driver monitoring system (DMS) application or an augmented reality (AR) application.

Meanwhile, in response to the second virtual machine executing an application with a higher safety level than the third virtual machine among the plurality of virtual machines, the central processor may be configured to control a reference fallback guarantee time of the application executed in the second virtual machine to be greater than a reference fallback guarantee time of the application executed in the third virtual machine.

In accordance with another aspect of the present disclosure, the above and other objectives can be accomplished by providing a signal processing device and a vehicle display apparatus including the same which include a central processor configured to execute an application for driving a vehicle, wherein the central processor is configured to: change a reference fallback guarantee time for an operation failure of the application based on a safety level of the application, and in response to determination of operation failure of the application based on the reference fallback guarantee time and a calculated fallback guarantee time, perform a fallback operation or a fail operation.

EFFECTS OF THE DISCLOSURE

A signal processing device and a vehicle display apparatus including the same according to an embodiment of the present disclosure include: at least one neural processor; and a central processor configured to execute an application for driving a vehicle, wherein the central processor is configured to: in response to determination of operation failure of the application, execute a second application, corresponding to the application, in another central processor or another signal processing device, and based on a safety level of the application, change a reference fallback guarantee time for the operation failure of the application. Accordingly, the application for driving the vehicle may be stably executed. Particularly, the application for driving the vehicle may be stably executed based on a safety level.

Meanwhile, the central processor may be configured to: in response to the safety level of the application being a first safety level, set the reference fallback guarantee time to a first time; and in response to the safety level of the application being a second safety level higher than the first safety level, set the reference fallback guarantee time to a second time longer than the first time. Accordingly, the application for driving the vehicle may be stably executed.

Meanwhile, in response to the safety level of the application being a third safety level lower than the first safety level, the central processor may be configured to set the reference fallback guarantee time to a third time shorter than the first time. Accordingly, the application for driving the vehicle may be stably executed.

Meanwhile, in response to a calculated fallback guarantee time being greater than or equal to the reference fallback guarantee time, the central processor may be configured to perform a predetermined operation. Accordingly, the application for driving the vehicle may be stably executed.

Meanwhile, in response to a calculated fallback guarantee time being less than the reference fallback guarantee time, the central processor may be configured to execute the second application, corresponding to the application, in another central processor or another signal processing device. Accordingly, the application for driving the vehicle may be stably executed.

Meanwhile, in response to a calculated fallback guarantee time being less than the reference fallback guarantee time, the central processor may be configured to perform a fallback operation. Accordingly, the application for driving the vehicle may be stably executed.

Meanwhile, in response to a calculated fallback guarantee time being less than the reference fallback guarantee time, the central processor may be configured to perform one of a plurality of fallback operations. Accordingly, the application for driving the vehicle may be stably executed.

Meanwhile, the plurality of fallback operations may include driver takeover request, blind brake, Lane Keeping and Blind Braking, Emergency lane change and braking, Pull over on a shoulder, or long distance route planning. Accordingly, the application for driving the vehicle may be stably executed.

Meanwhile, in a state in which a calculated fallback guarantee time is greater than the reference fallback guarantee time and the calculated fallback guarantee time is reduced, as a difference between the calculated estimated reference fallback guarantee time and the reference fallback guarantee time decreases, the central processor may be configured to restrict execution of an application with a higher safety level. Accordingly, the application for driving the vehicle may be stably executed.

Meanwhile, the central processor may be configured to: in response to a difference between the calculated estimated reference fallback guarantee time and the reference fallback guarantee time being a first time, execute an application corresponding to the first safety level; and in response to a difference between the calculated estimated reference fallback guarantee time and the reference fallback guarantee time being a second time greater than the first time, execute an application corresponding to a second safety level higher than the first safety level. Accordingly, the application for driving the vehicle may be stably executed.

Meanwhile, the central processor may be configured to change the reference fallback guarantee time based on a driving environment of the vehicle. Accordingly, the application for driving the vehicle may be stably executed.

Meanwhile, the central processor may be configured to calculate a fallback guarantee time based on at least one of temperature of a system, performance based on the safety level, an error history of the system, latency of the application or workload of the system. Accordingly, the application for driving the vehicle may be stably executed.

Meanwhile, the neural processor may be configured to perform neural processing based on at least one of the temperature of the system, the performance based on the safety level, the error history of the system, the latency of the application or the workload of the system, and to calculate a fallback guarantee time based on the neural processing. Accordingly, the application for driving the vehicle may be stably executed.

Meanwhile, the neural processor may be configured to perform neural processing based on a feedback on power data or temperature data in result data of the neural processing. Accordingly, the application for driving the vehicle may be stably executed.

Meanwhile, the central processor may be configured to execute a hypervisor and a plurality of virtual machines on the hypervisor, wherein a first virtual machine among the plurality of virtual machines may be configured to execute a neural system service for controlling the neural processor. Accordingly, the application for driving the vehicle may be stably executed.

Meanwhile, a second virtual machine among the plurality of virtual machines may be configured to execute an ADAS application, and a third virtual machine among the plurality of virtual machines may be configured to execute a driver monitoring system (DMS) application or an augmented reality (AR) application. Accordingly, the application for driving the vehicle may be stably executed.

Meanwhile, in response to the second virtual machine executing an application with a higher safety level than the third virtual machine among the plurality of virtual machines, the central processor may be configured to control a reference fallback guarantee time of the application executed in the second virtual machine to be greater than a reference fallback guarantee time of the application executed in the third virtual machine. Accordingly, the application for driving the vehicle may be stably executed.

A signal processing device and a vehicle display apparatus including the same according to another embodiment of the present disclosure include a central processor configured to execute an application for driving a vehicle, wherein the central processor is configured to: change a reference fallback guarantee time for an operation failure of the application based on a safety level of the application, and in response to determination of operation failure of the application based on the reference fallback guarantee time and a calculated fallback guarantee time, perform a fallback operation or a fail operation. Accordingly, the application for driving the vehicle may be stably executed. Particularly, the application for driving the vehicle may be stably executed based on a safety level.

6

Figure 9:
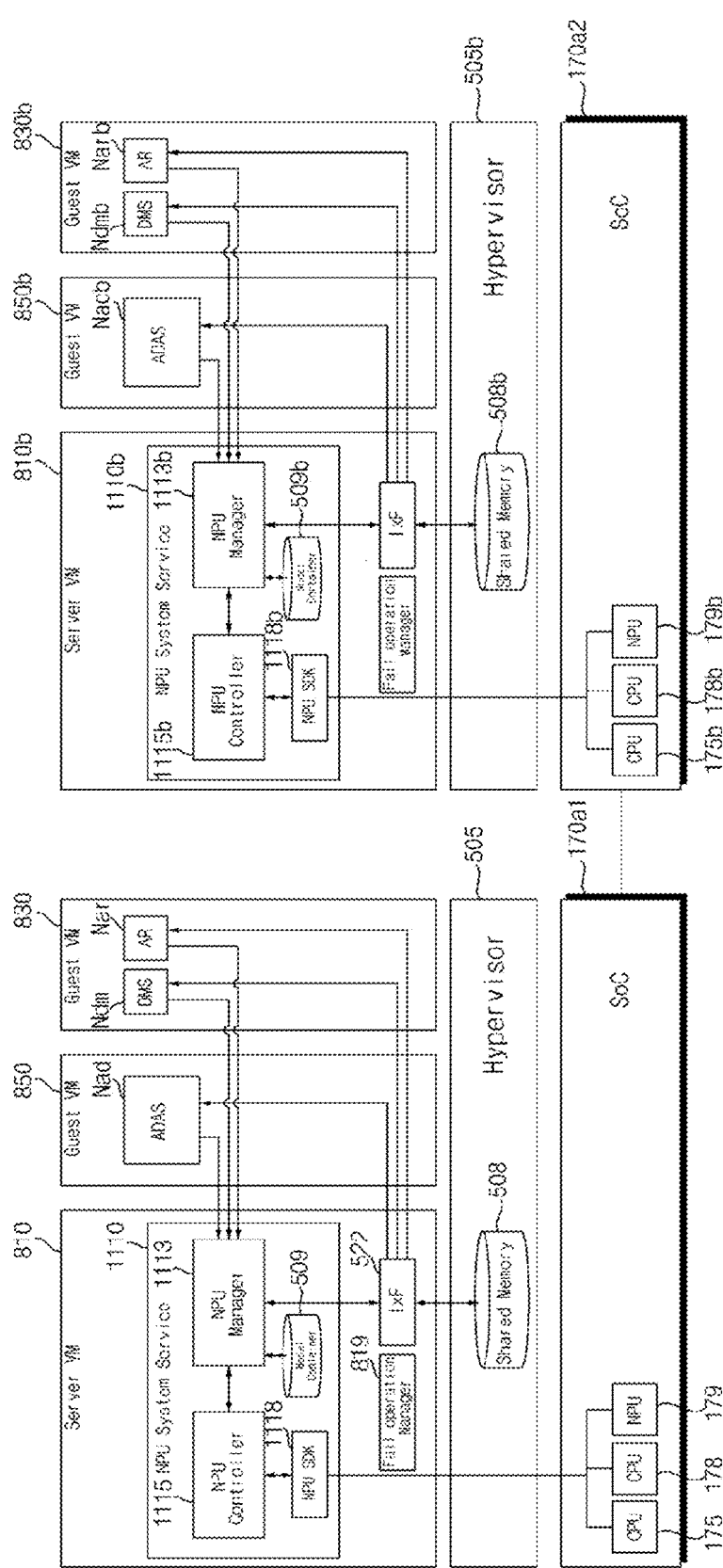
FIG. 9 is a block diagram illustrating another example of a vehicle display apparatus according to an embodiment of the present disclosure.
Figure 10:
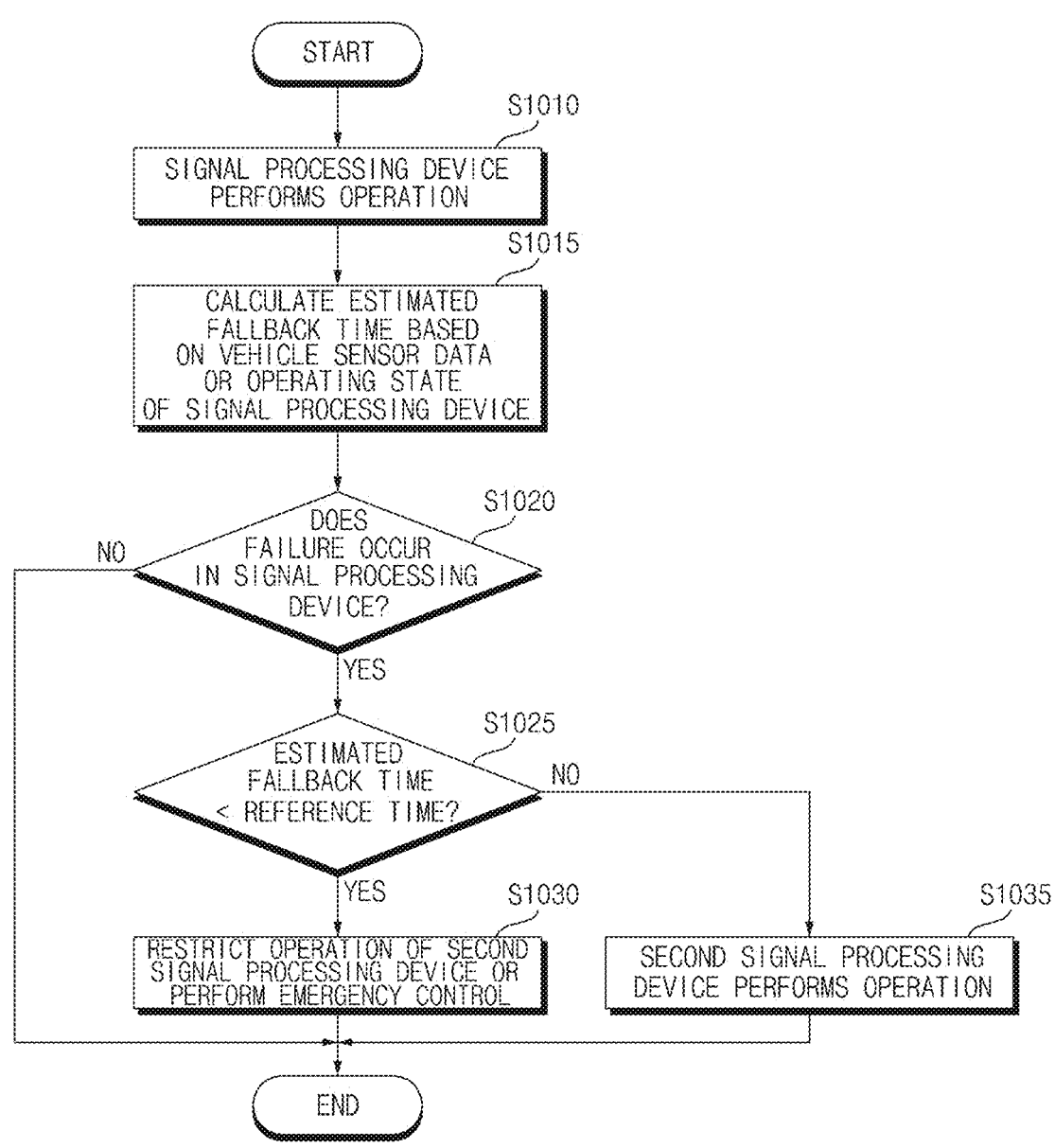
FIG. 10 is a flowchart illustrating a method of operating a vehicle display apparatus according to an embodiment of the present disclosure.
Figure 11:
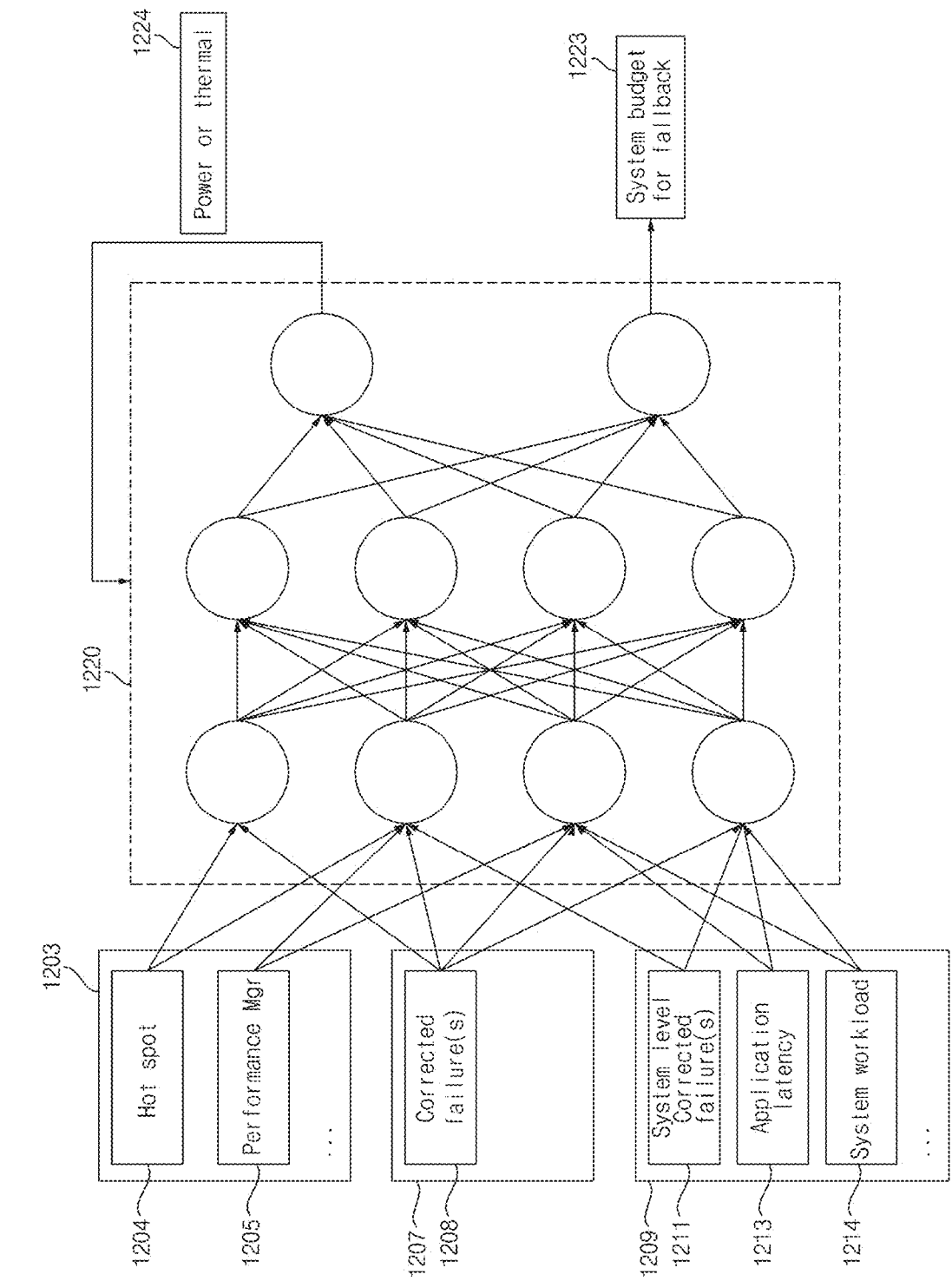

FIGS. 11 to 13 are diagrams referred to in the description of operation of FIG. 9 or FIG. 10.

DETAILED DESCRIPTION

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
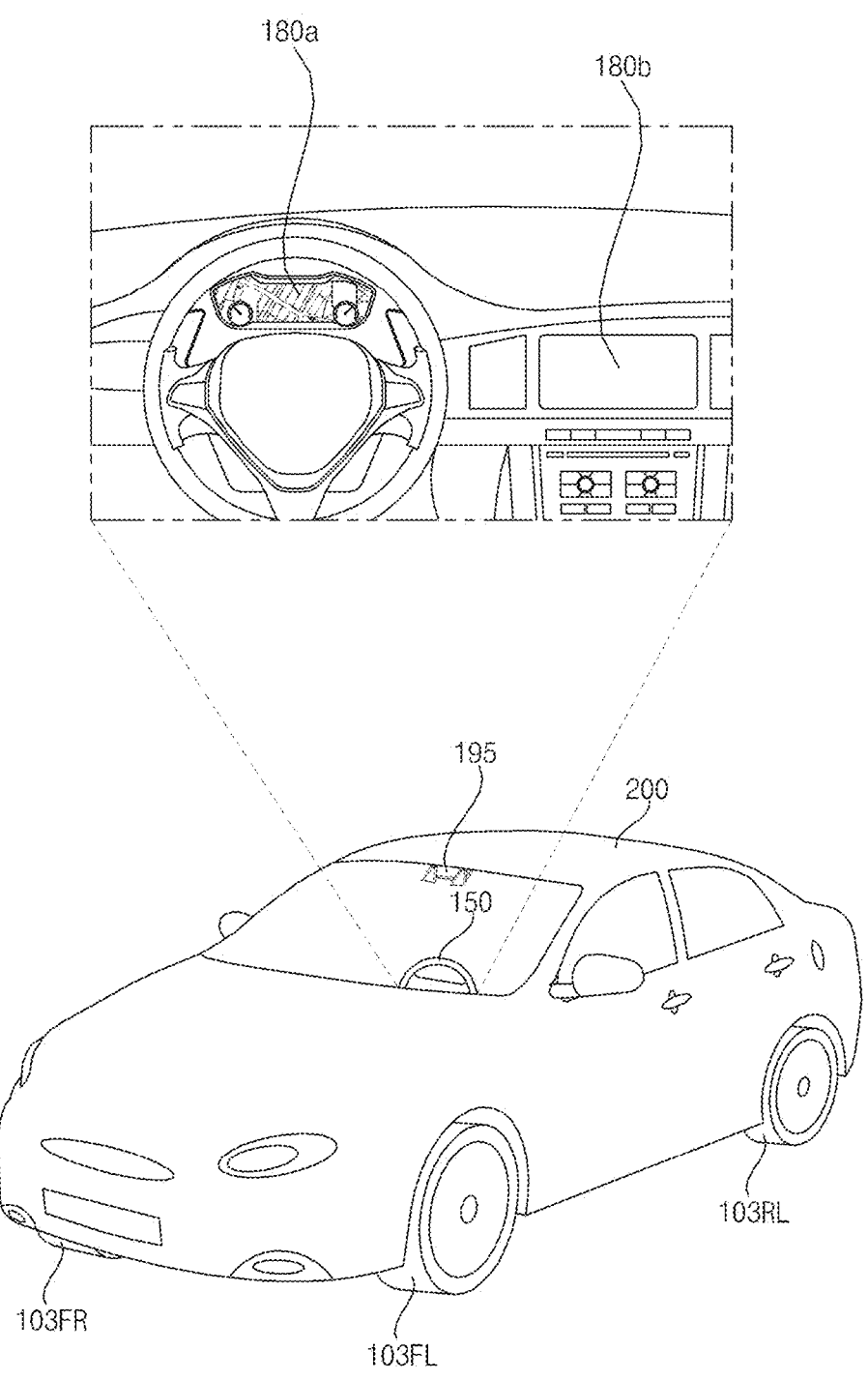
FIG. 1 is a diagram illustrating an example of the exterior and interior of a vehicle.

FIG. 1 is a diagram illustrating an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 2:
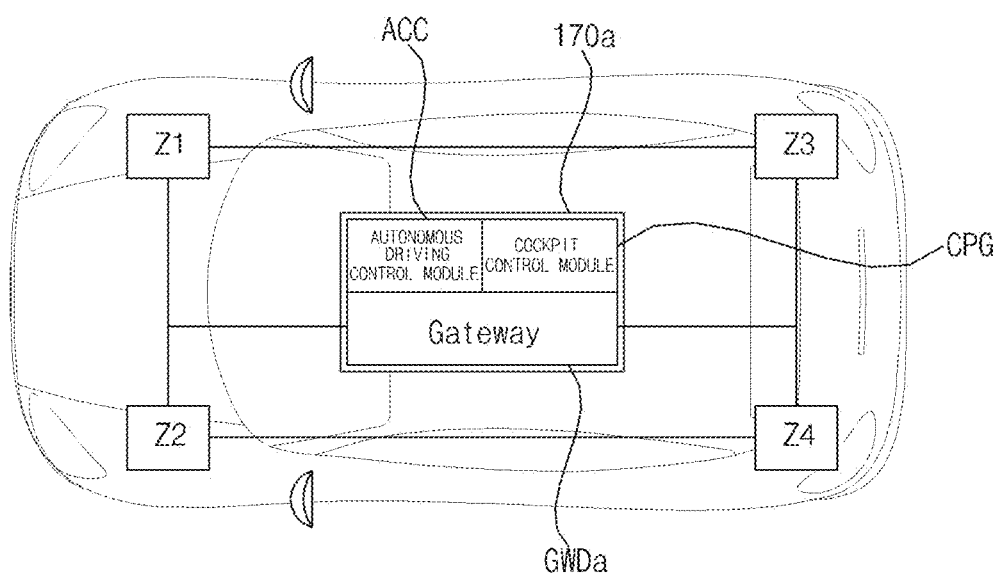
FIG. 2 is a diagram illustrating an example of a vehicle communication gateway.

FIG. 2 is a diagram illustrating an example of a vehicle communication gateway.

Referring to FIG. 2, an architecture 300a of a vehicle communication gateway may correspond to a zone-based architecture.

Accordingly, vehicle internal sensor devices and processors may be mounted in each of a plurality of zones Z1 to Z4, and a signal processing device 170a including a vehicle communication gateway GWDa may be disposed at the center of the plurality of zones Z1 to Z4.

Meanwhile, the signal processing device 170a may further include an autonomous driving control module ACC, a cockpit control module CPG, etc., in addition to the vehicle communication gateway GWDa.

The vehicle communication gateway GWDa in the signal processing device 170a may be a High Performance Computing (HPC) gateway.

That is, as an integrated HPC gateway, the signal processing device 170a of FIG. 2 may exchange data with an external communication module (not shown) or processors (not shown) in the plurality of zones Z1 to Z4.

Figure 3A:
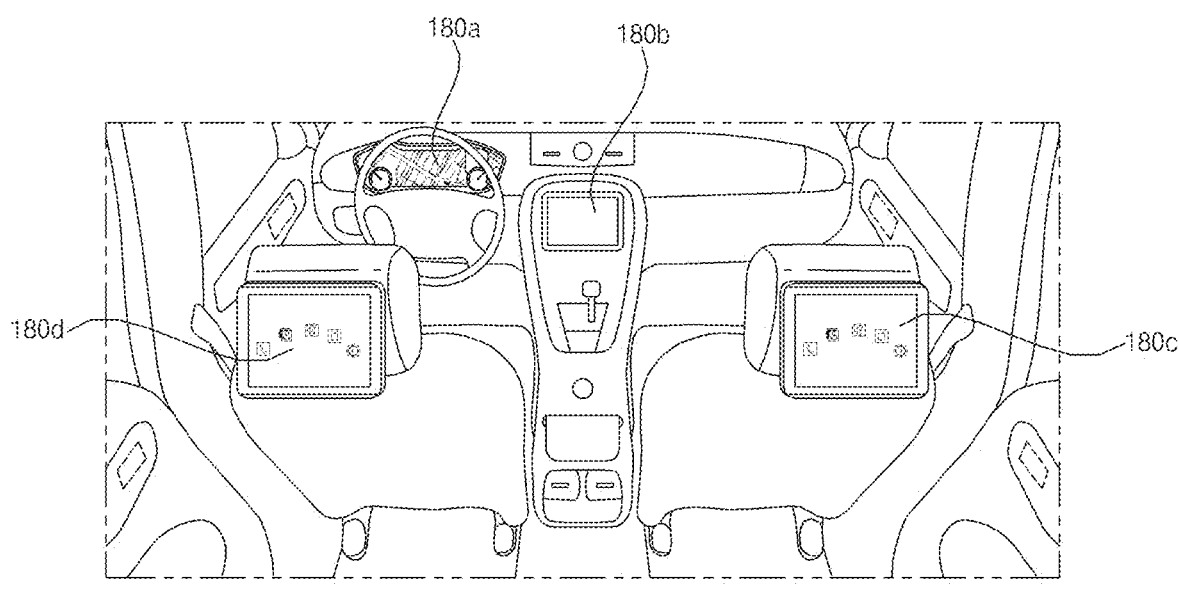
FIG. 3A is a diagram illustrating an example of a vehicle display apparatus in a vehicle.

FIG. 3A is a diagram illustrating an example of a vehicle display apparatus in a vehicle.

Referring to the figure, a cluster display 180a, an audio video navigation (AVN) display 180b, rear seat entertainment displays 180c and 180d, and a rear-view mirror display (not shown) may be mounted in the vehicle.

Figure 3B:
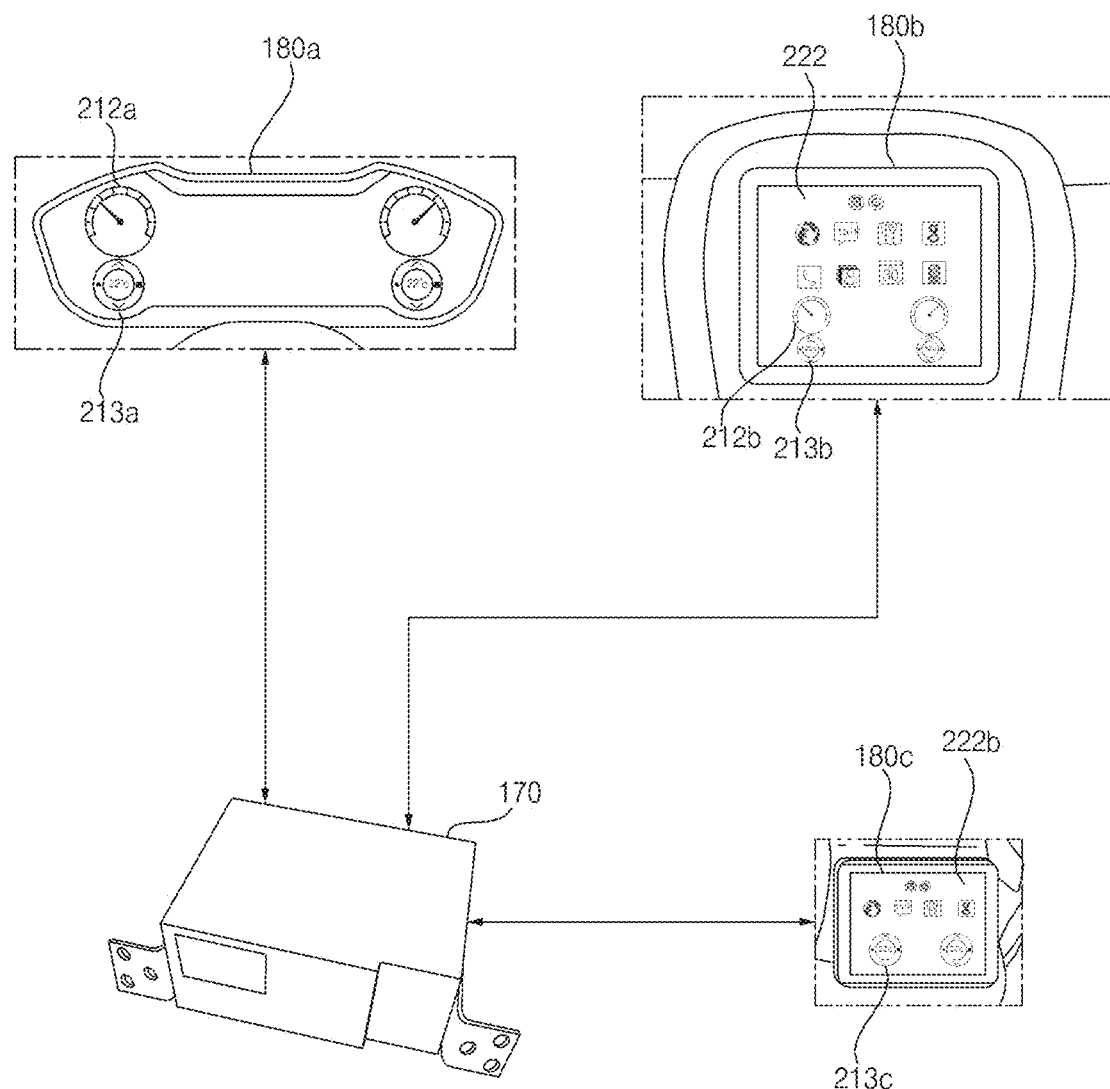
FIG. 3B is a diagram illustrating another example of a vehicle display apparatus in a vehicle.

FIG. 3B is a diagram illustrating another example of a vehicle display apparatus in a vehicle.

A vehicle display apparatus 100 according to the embodiment of the present disclosure may include a plurality of displays 180a and 180b and a signal processing device 170 configured to perform signal processing in order to display images and information on the plurality of displays 180a and 180b, and to output an image signal to at least one of the displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines (not shown) may be executed by a hypervisor 505 in the processor 175.

The second virtual machine (not shown) may be operated for the first display 180a, and the third virtual machine (not shown) may be operated for the second display 180b.

Meanwhile, the first virtual machine (not shown) in the processor 175 may be configured to set a shared memory 508 based on the hypervisor 505 for transmission of the same data to the second virtual machine (not shown) and the third virtual machine (not shown). Consequently, the first display 180a and the second display 180b in the vehicle may display the same information or the same images in a synchronized state.

Meanwhile, the first virtual machine (not shown) in the processor 175 shares at least some of data with the second virtual machine (not shown) and the third virtual machine (not shown) for divided processing of data. Consequently, the plurality of virtual machines for the plurality of displays in the vehicle may divide and process data.

Meanwhile, the first virtual machine (not shown) in the processor 175 may receive and process wheel speed sensor data of the vehicle, and may transmit the processed wheel speed sensor data to at least one of the second virtual machine (not shown) or the third virtual machine (not shown). Consequently, at least one virtual machine may share the wheel speed sensor data of the vehicle.

Meanwhile, the vehicle display apparatus 100 according to the embodiment of the present disclosure may further include a rear seat entertainment (RSE) display 180c configured to display driving state information, simple navigation information, various kinds of entertainment information, or an image.

The signal processing device 170 may further execute a fourth virtual machine (not shown), in addition to the first to third virtual machines (not shown), on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

The signal processing device 170 according to the embodiment of the present disclosure may be configured to display the same information or the same images in a synchronized state on the displays 180a to 180c to be operated under various operating systems.

Meanwhile, FIG. 3B illustrates an example in which a vehicle speed indicator 212a and a vehicle internal temperature indicator 213a are displayed on a first display 180a, a home screen 222 including a plurality of applications, a vehicle speed indicator 212b, and a vehicle internal temperature indicator 213b is displayed on a second display 180b, and a second home screen 222b including a plurality of applications and a vehicle internal temperature indicator 213c is displayed on a third display 180c.

Figure 4:
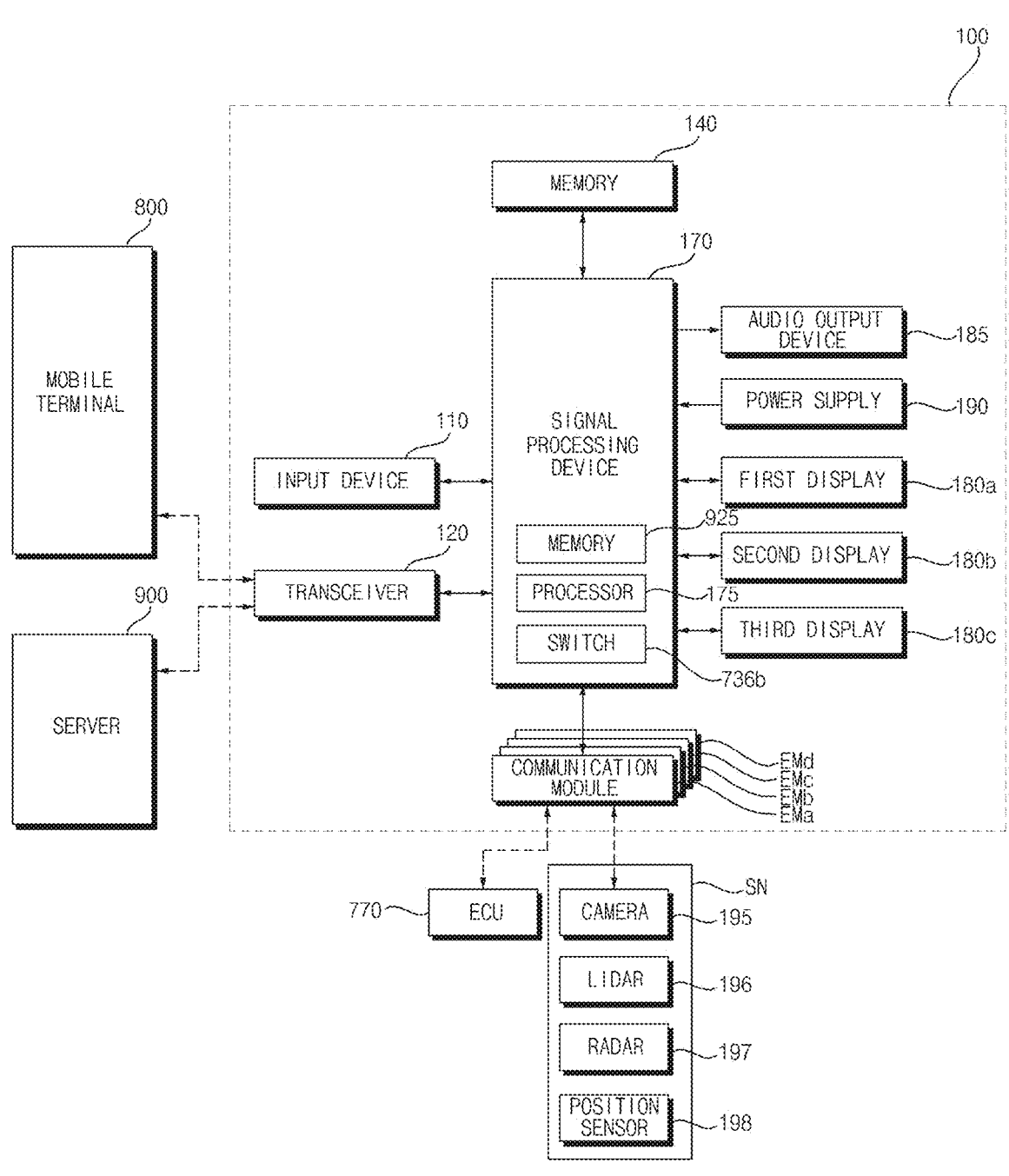
FIG. 4 is an internal block diagram illustrating an example of a vehicle display apparatus of FIG. 3B.

FIG. 4 is an internal block diagram illustrating an example of the vehicle display apparatus of FIG. 3B.

Referring to FIG. 4, a vehicle display apparatus 100 according to an embodiment of the present disclosure may include an input device 110, a transceiver 120 for communication with an external device, a plurality of communication modules EMa to EMd for internal communication, a memory 140, the signal processing device 170, a plurality of displays 180a to 180c, an audio output device 185, and a power supply 190.

The plurality of communication modules EMa to EMd may be disposed in a plurality of zones Z1 to Z4, respectively, in FIG. 2.

Meanwhile, the signal processing device 170 may be provided therein with a communication switch 736b for data communication with the respective communication modules EMa to EMd.

The respective communication modules EMa to EMd may perform data communication with the plurality of sensor devices SN or the ECU 770.

Meanwhile, a plurality of sensor devices SN may include a camera 195, a lidar sensor 196, a radar sensor 197, or a position sensor 198.

The input device 110 may include a physical button or pad for button input or touch input.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes, such as Bluetooth™, Wi-Fi, WIFI Direct, and APIX, may be used as a wireless data communication scheme.

The transceiver 120 may receive weather information and road traffic state information, such as Transport Protocol Experts Group (TPEG) information, from a mobile terminal 800 or a server 900. To this end, the transceiver 120 may include a mobile communication module (not shown).

Figure 7:
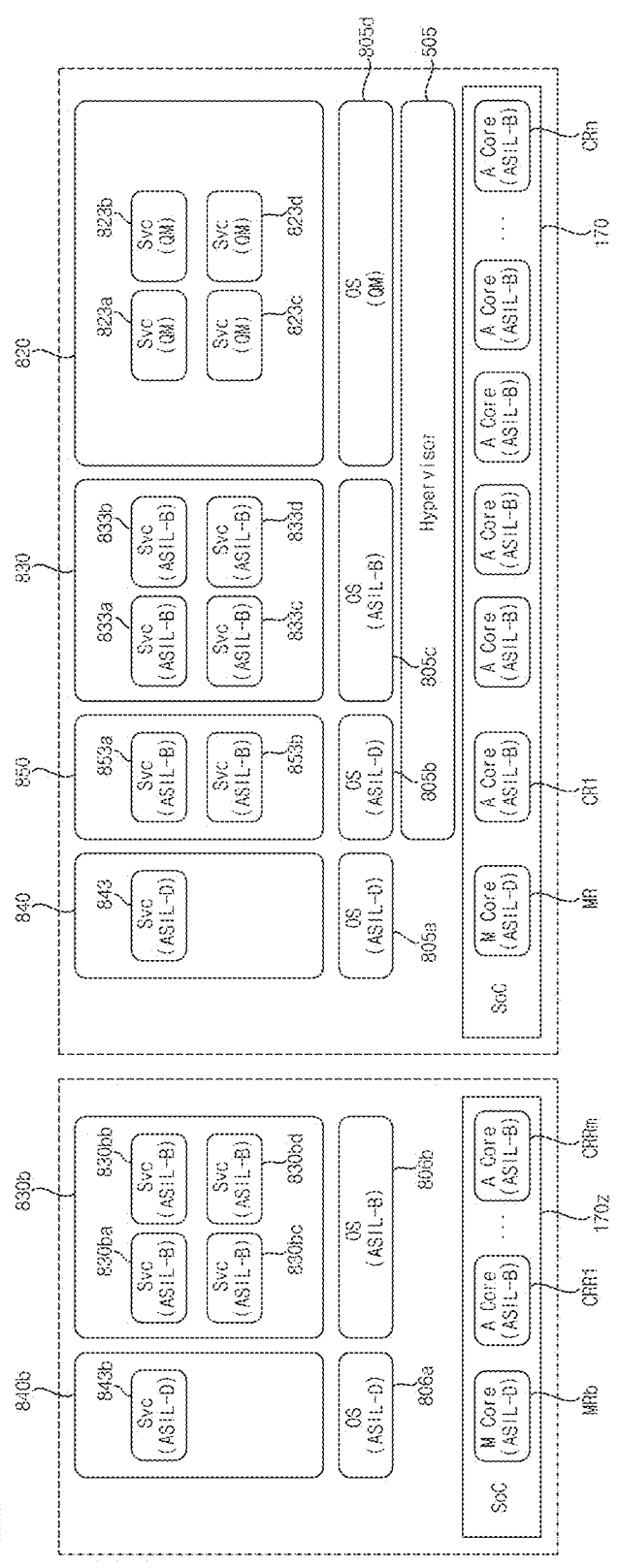
FIG. 7 is a block diagram illustrating an example of a signal processing device according to an embodiment of the present disclosure.

The plurality of communication modules EMa to EMd may receive sensor data and the like from the electronic control unit (ECU) 770 or the sensor device SN or a zonal signal processing device 170Z of FIG. 7, and may transmit the received sensor data to the signal processing device 170.

Here, the sensor data may include at least one of vehicle direction data, vehicle position data (global positioning system (GPS) data), vehicle angle data, vehicle speed data, vehicle acceleration data, vehicle inclination data, vehicle forward/backward movement data, battery data, fuel data, tire data, vehicle lamp data, vehicle internal temperature data, and vehicle internal humidity data.

The sensor data may be acquired from a heading sensor, a yaw sensor, a gyro sensor, a position sensor, a vehicle forward/backward movement sensor, a wheel sensor, a vehicle speed sensor, a car body inclination sensor, a battery sensor, a fuel sensor, a tire sensor, a steering-wheel-rotation-based steering sensor, a vehicle internal temperature sensor, or a vehicle internal humidity sensor.

Meanwhile, the position module may include a GPS module configured to receive GPS information or a position sensor 198.

Meanwhile, at least one of the plurality of communication modules EMa to EMd may transmit position information data sensed by the GPS module or the position sensor 198 to the signal processing device 170.

Meanwhile, at least one of the plurality of communication modules EMa to EMd may receive front image data of the vehicle, side-of-vehicle image data, rear image data of the vehicle, and obstacle-around-vehicle distance information from the camera 195, the lidar sensor 196, or the radar sensor 197, etc., and may transmit the received information to the signal processing device 170.

The memory 140 may store various data necessary for overall operation of the vehicle display apparatus 100, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control the overall operation of each device in the vehicle display apparatus 100.

For example, the signal processing device 170 may include a processor 175 configured to perform signal processing for the vehicle displays 180*a* and 180*b*.

The processor 175 may execute the first to third virtual machines (not shown) on the hypervisor 505 (see FIG. 10) in the processor 175.

Among the first to third virtual machines (not shown) (see FIG. 10), the first virtual machine (not shown) may be called a server virtual machine, and the second and third virtual machines (not shown) and (not shown) may be called guest virtual machines.

For example, the first virtual machine (not shown) in the processor 175 may receive sensor data from the plurality of sensor devices, such as vehicle sensor data, position information data, camera image data, audio data, or touch input data, and may process and output the received sensor data.

As described above, the first virtual machine (not shown) may process most of the data, whereby 1:N data sharing may be achieved.

In another example, the first virtual machine (not shown) may directly receive and process CAN data, Ethernet data, audio data, radio data, USB data, and wireless communication data for the second and third virtual machines (not shown).

Further, the first virtual machine (not shown) may transmit the processed data to the second and third virtual machines (not shown).

Accordingly, only the first virtual machine (not shown), among the first to third virtual machines (not shown), may receive sensor data from the plurality of sensor devices, communication data, or external input data, and may perform signal processing, whereby load in signal processing by the other virtual machines may be reduced and 1:N data communication may be achieved, and therefore synchronization at the time of data sharing may be achieved.

Meanwhile, the first virtual machine (not shown) may be configured to write data in the shared memory 508, whereby the second virtual machine (not shown) and the third virtual machine (not shown) share the same data.

For example, the first virtual machine (not shown) may be configured to write vehicle sensor data, the position information data, the camera image data, or the touch input data in the shared memory 508, whereby the second virtual machine (not shown) and the third virtual machine (not shown) share the same data. Consequently, 1:N data sharing may be achieved.

Eventually, the first virtual machine (not shown) may process most of the data, whereby 1:N data sharing may be achieved.

Meanwhile, the first virtual machine (not shown) in the processor 175 may be configured to set the shared memory 508 based on the hypervisor 505 in order to transmit the same data to the second virtual machine (not shown) and the third virtual machine (not shown).

Meanwhile, the signal processing device 170 may process various signals, such as an audio signal, an image signal, and a data signal. To this end, the signal processing device 170 may be implemented in the form of a system on chip (SOC).

Figure 5A:
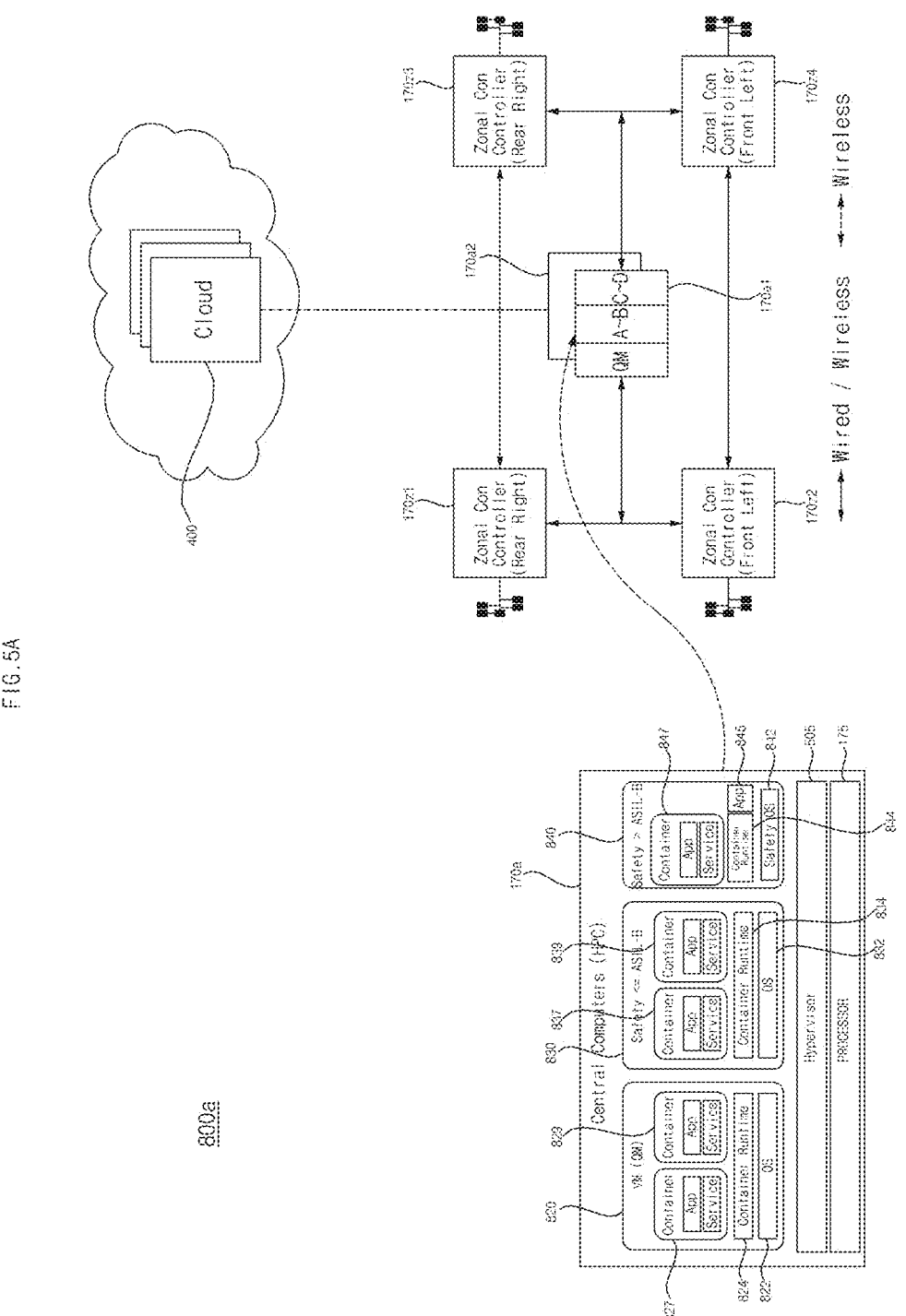
FIGS. 5A to 5D are diagrams illustrating various examples of a vehicle display apparatus.

Meanwhile, the signal processing device 170 in the display apparatus 100 of FIG. 4 may be the same as signal processing devices 170, 170*a*1, and 170*a*2 of a vehicle display apparatus of FIG. 5A and subsequent figures.

FIGS. 5A to 5D are diagrams illustrating various examples of a vehicle display apparatus.

FIG. 5A is a diagram illustrating an example of a vehicle display apparatus according to an embodiment of the present disclosure.

Referring to FIG. 5A, a vehicle display apparatus 800*a* according to an embodiment of the present disclosure includes signal processing devices 170*a*1 and 170*a*2 and a plurality of zonal signal processing devices 170Z1 to 170Z4.

Meanwhile, two signal processing devices 170*a*1 and 170*a*2 are illustrated in the figure, which are provided for backup and the like, and one signal processing device is also possible.

Meanwhile, the signal processing devices 170*a*1 and 170*a*2 may be referred to as a High Performance Computing (HPC) signal processing devices.

The plurality of zonal signal processing devices 170Z1 to 170Z4 may be located in the respective zones Z1 to Z4 and may transmit sensor data to the signal processing devices 170*a*1 and 170*a*2.

The signal processing devices 170*a*1 and 170*a*2 may receive data by wire from the plurality of zonal signal processing devices 170Z1 to 170Z4 or a communication device 120.

In the drawing, an example is illustrated in which the signal processing devices 170*a*1 and 170*a*2 exchange data with the plurality of zonal signal processing devices 170Z1 to 170Z4 based on wired communication, and the signal processing devices 170*a*1 and 170*a*2 exchange data with the server 400 based on wireless communication, but the communication device 120 may exchange data with the server 400 based on wireless communication, and the signal processing devices 170*a*1 and 170*a*2 may exchange data with the communication device 120 based on wired communication.

Meanwhile, the data received by the signal processing devices 170*a*1 and 170*a*2 may include camera data or sensor data.

For example, the vehicle internal sensor data may include at least one of vehicle wheel speed data, vehicle direction data, vehicle location data (global positioning system (GPS) data), vehicle angle data, vehicle speed data, vehicle acceleration data, vehicle inclination data, vehicle forward/backward movement data, battery data, fuel data, tire data, vehicle lamp data, vehicle internal temperature data, vehicle internal humidity data, external vehicle radar data or external vehicle lidar data.

Meanwhile, the camera data may include external vehicle camera data and vehicle internal camera data.

Meanwhile, the signal processing devices 170a1 and 170a2 may execute a plurality of virtual machines 820, 830, and 840 based on safety levels.

In the drawing, an example is illustrated in which the processor 175 in the signal processing device 170a executes the hypervisor 505, and executes first to third virtual machines 820 to 840 on the hypervisor 505 according to the Automotive Safety Integrity Level (ASIL).

The first virtual machine 820 may be a virtual machine corresponding to quality management (QM) which is the lowest risk level of the ASIL with no mandatory need.

The first virtual machine 820 may execute an operating system 822, a container runtime 824 on the operating system 822, and containers 827 and 829 on the container runtime 824.

The second virtual machine 830 may be a virtual machine corresponding to ASIL A or ASIL B with the combination of severity, exposure, and controllability values being 7 or 8.

The second virtual machine 830 may execute an operating system 832, a container runtime 834 on the operating system 832, and containers 837 and 839 on the container runtime 834.

The third virtual machine 840 may be a virtual machine corresponding to ASIL C or ASIL D with the combination of severity, exposure, and controllability values being 9 or 10.

Meanwhile, ASIL D may correspond to a grade that requires the highest level of safety.

The third virtual machine 840 may execute a safety operating system 842 and an application 845 on the operating system 842.

Meanwhile, the third virtual machine 840 may also execute the safety operating system 842, a container runtime 844 on the safety operating system 842, and a container 847 on the container runtime 844.

Meanwhile, unlike the drawing, the third virtual machine 840 may also be executed by a separate core, rather than by the processor 175, which will be described below with reference to FIG. 5B.

Figure 5B:
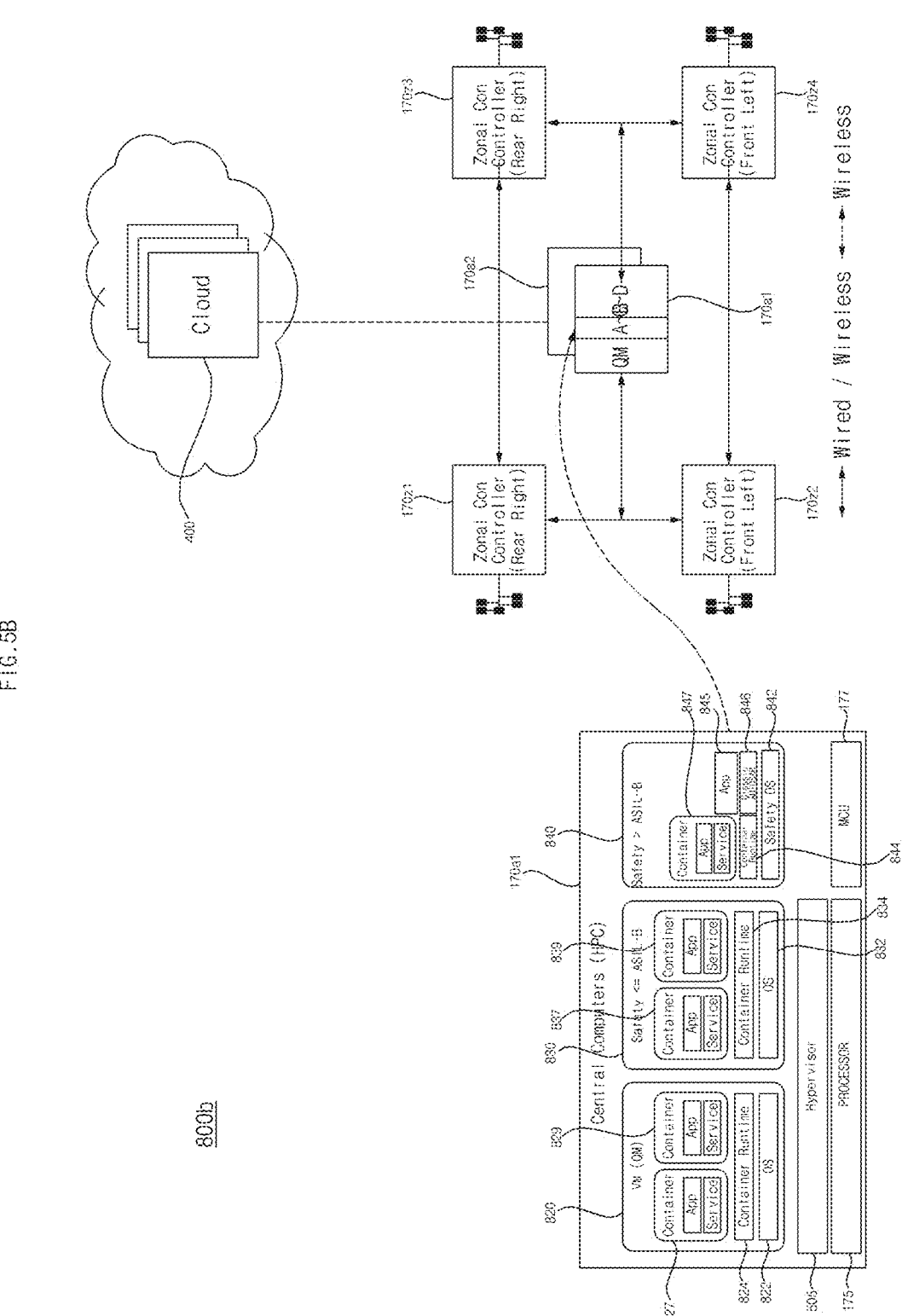

FIG. 5B is a diagram illustrating another example of a vehicle display apparatus according to an embodiment of the present disclosure.

Referring to FIG. 5B, a vehicle display apparatus 800b according to an embodiment of the present disclosure includes signal processing devices 170a1 and 170a2 and a plurality of zonal signal processing devices 170Z1 to 170Z4.

The vehicle display apparatus 800b of FIG. 5B is similar to the vehicle display apparatus 800a of FIG. 5A, with a difference being that the signal processing device 170a1 of FIG. 5B is partially different from the signal processing device 170a1 of FIG. 5A.

The following description will focus on the difference, in which the signal processing device 170a may include a processor 175 and a second processor 177.

The processor 175 in the signal processing device 170a1 executes the hypervisor 505, and executes the first and second virtual machines 820 and 830 on the hypervisor 505 according to the ASIL.

The first virtual machine 820 may execute the operating system 822, the container runtime 824 on the operating system 822, and the containers 827 and 829 on the container runtime 824.

The second virtual machine 830 may execute the operating system 832, the container runtime 834 on the operating system 832, and the containers 837 and 839 on the container runtime 834.

Meanwhile, the second processor 177 in the signal processing device 170a1 may execute the third virtual machine 840.

The third virtual machine 840 may execute the safety operating system 842, an AUTOSAR 846 on the operating system 842, and an application 845 on the AUTOSAR 846. That is, unlike FIG. 5A, the third virtual machine 840 may further execute the AUTOSAR 846 on the operating system 842.

Meanwhile, similarly to FIG. 5A, the third virtual machine 840 may also execute the safety operating system 842, the container runtime 844 on the safety operating system 842, and the container 847 on the container runtime 844.

Meanwhile, unlike the first and second virtual machines 820 and 830, the third virtual machine 840 that requires a high safety level is desirably executed by the second processor 177 that is a different core or a different processor.

Meanwhile, in the signal processing devices 170a1 and 170a2 of FIGS. 5A and 5B, if there is abnormality in the first signal processing device 170a1, the second signal processing device 170a2 may operate which is provided for backup purposes.

Unlike the example, the signal processing devices 170a1 and 170a2 may operate at the same time, among which the first signal processing device 170a1 may operate as a main device, and the second signal processing device 170a2 may operate as a sub device, which will be described below with reference to FIGS. 5C and 5D.

Figure 5C:
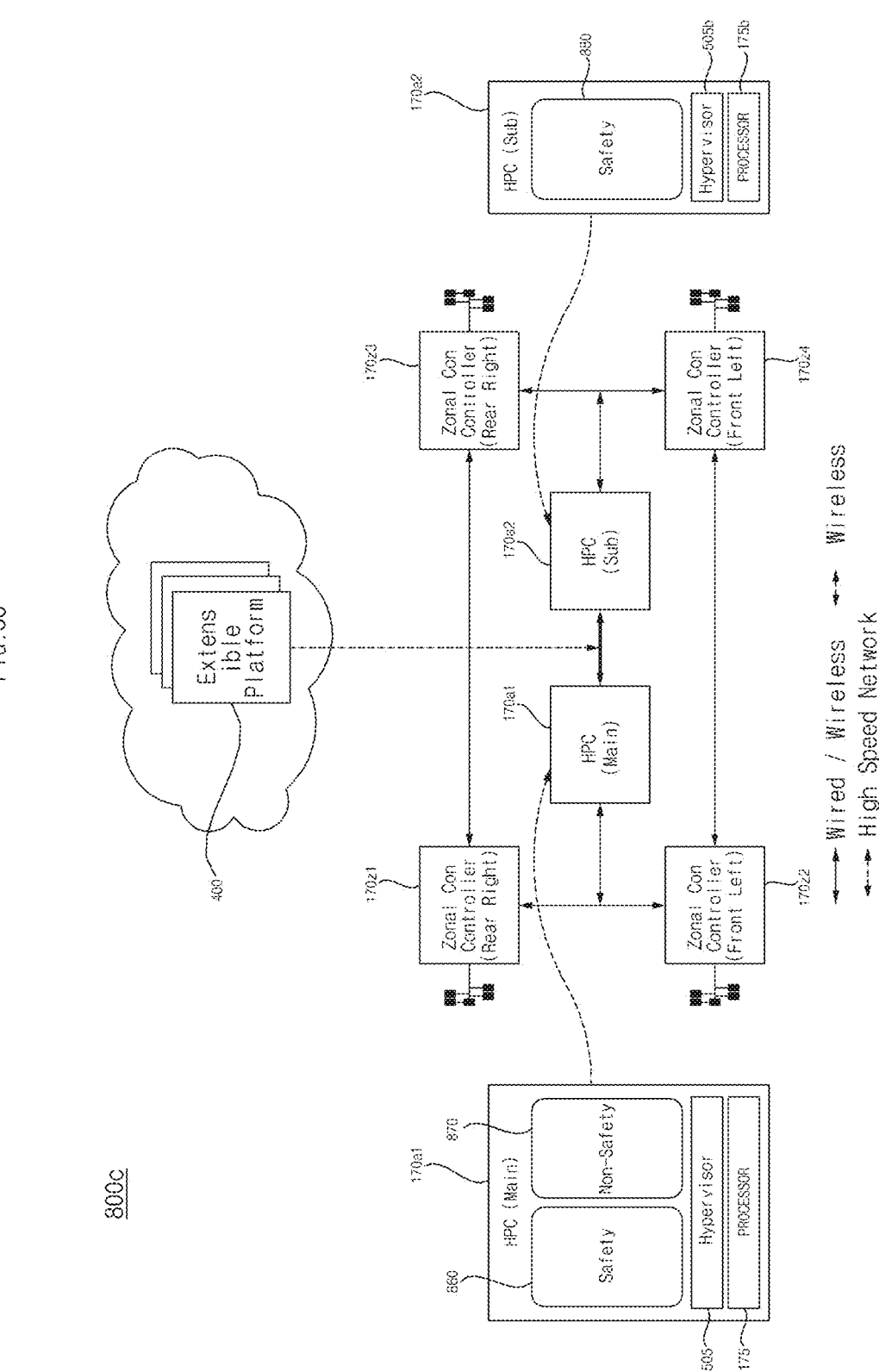

FIG. 5C is a diagram illustrating yet another example of a vehicle display apparatus according to an embodiment of the present disclosure.

Referring to FIG. 5C, a vehicle display apparatus 800c according to an embodiment of the present disclosure includes signal processing devices 170a1 and 170a2 and a plurality of zonal signal processing devices 170Z1 to 170Z4.

Meanwhile, two signal processing devices 170a1 and 170a2 are illustrated in the figure, which are provided for backup and the like, and one signal processing device is also possible.

Meanwhile, the signal processing devices 170a1 and 170a2 may be referred to as a High Performance Computing (HPC) signal processing devices.

The plurality of zonal signal processing devices 170Z1 to 170Z4 may be located in the respective zones Z1 to Z4 and may transmit sensor data to the signal processing devices 170a1 and 170a2.

The signal processing devices 170a1 and 170a2 may receive data by wire from the plurality of zonal signal processing devices 170Z1 to 170Z4 or a communication device 120.

In the drawing, an example is illustrated in which the signal processing devices 170a1 and 170a2 exchange data with the plurality of zonal signal processing devices 170Z1 to 170Z4 based on wired communication, and the signal processing devices 170a1 and 170a2 exchange data with the server 400 based on wireless communication, but the communication device 120 may exchange data with the server 400 based on wireless communication, and the signal processing devices 170a1 and 170a2 exchange data with the communication device 120 based on wired communication.

Meanwhile, the data received by the signal processing devices 170a1 and 170a2 may include camera data or sensor data.

Meanwhile, the processor 175 in the first signal processing device 170a1 of the signal processing devices 170a1 and 170a2 may execute the hypervisor 505, and may execute each of a safety virtual machine 860 and a non safety virtual machine 870 on the hypervisor 505.

Meanwhile, the processor 175b in the second signal processing device 170a2 of the signal processing devices 170a1 and 170a2 may execute the hypervisor 505b, and may execute only a safety virtual machine 880 on the hypervisor 505.

In the method, safety and non safety virtual machines may be processed separately by the first signal processing device 170a1 and the second signal processing device 170a2, thereby improving stability and processing speed.

Meanwhile, high-speed network communication may be performed between the first signal processing device 170a1 and the second signal processing device 170a2.

Figure 5D:
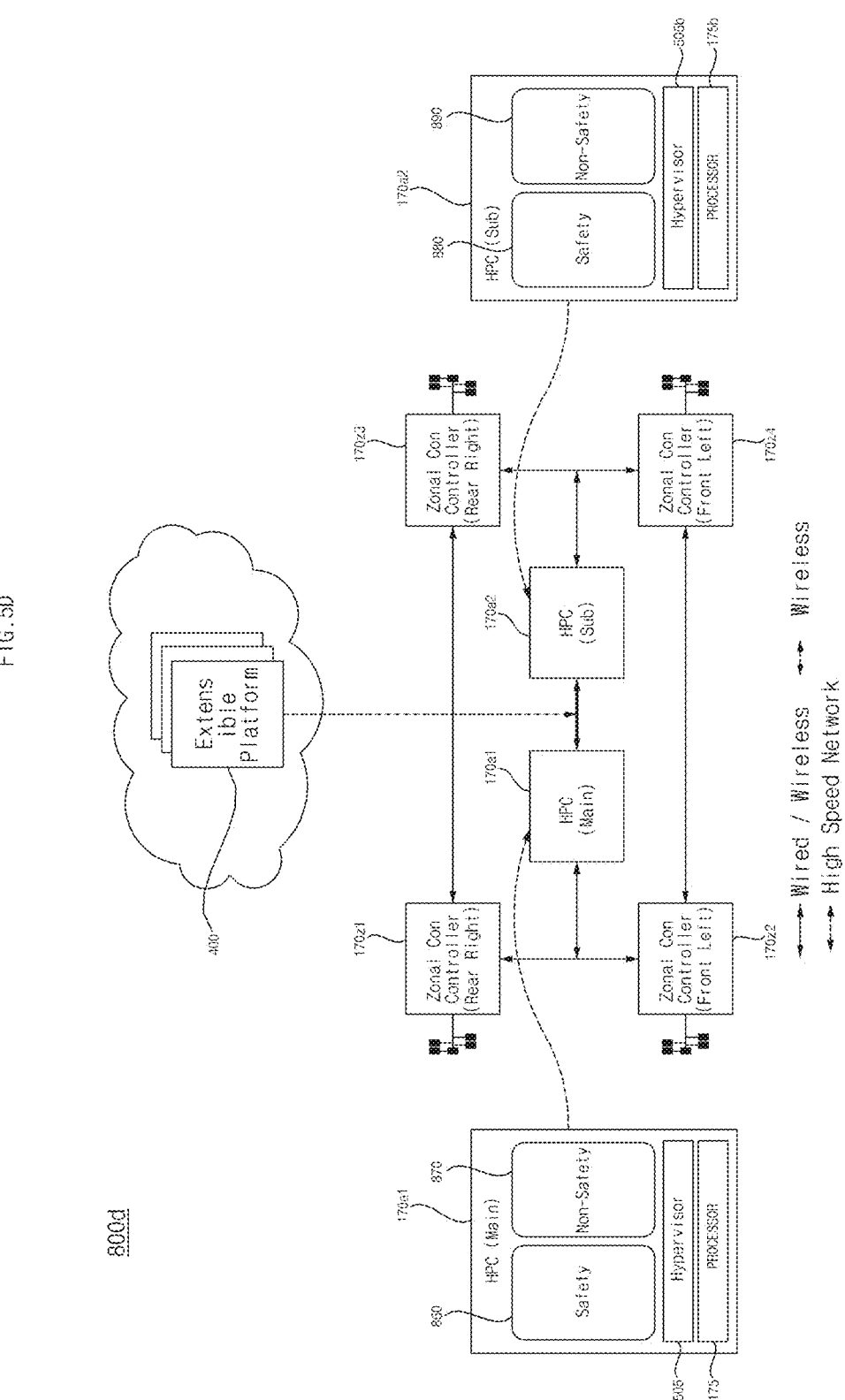

FIG. 5D is a diagram illustrating yet another example of a vehicle display apparatus according to an embodiment of the present disclosure.

Referring to FIG. 5D, a vehicle display apparatus 800d according to an embodiment of the present disclosure includes signal processing devices 170a1 and 170a2 and a plurality of zonal signal processing devices 170Z1 to 170Z4.

The vehicle display apparatus 800d of FIG. 5D is similar to the vehicle display apparatus 800c of FIG. 5C, with a difference being that the second signal processing device 170a2 of FIG. 5D is partially different from the second signal processing device 170a2 of FIG. 5C.

The processor 175b in the second signal processing device 170a2 of FIG. 5D may execute the hypervisor 505b, and may execute each of a safety virtual machine 880 and a non safety virtual machine 890 on the hypervisor 505.

That is, unlike FIG. 5C, there is a difference in that the processor 175b in the second signal processing device 170a2 further executes the non safety virtual machine 890.

In the method, safety and non safety virtual machines may be processed separately by the first signal processing device 170a1 and the second signal processing device 170a2, thereby improving stability and processing speed.

Figure 6:
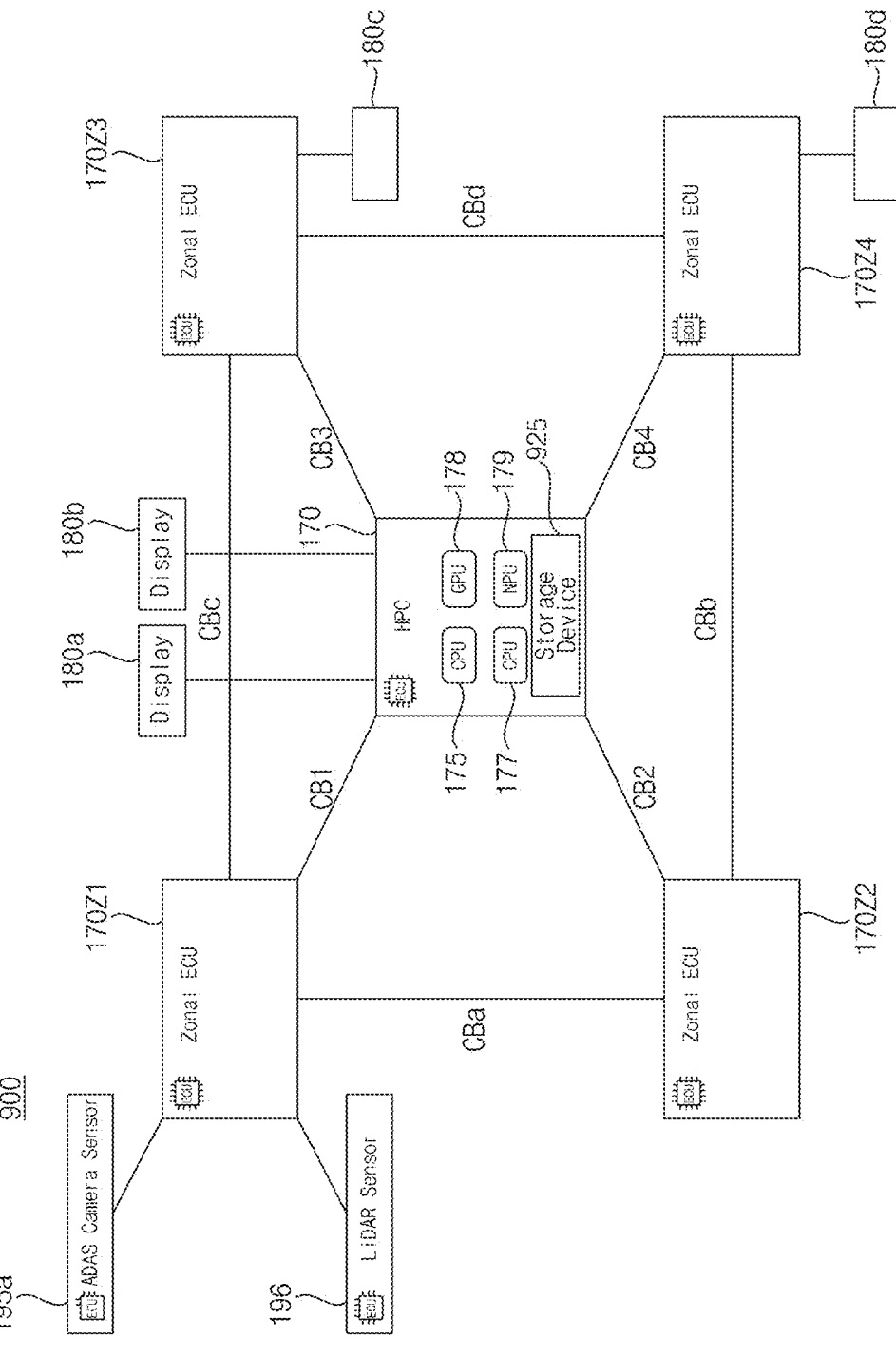
FIG. 6 is a block diagram illustrating an example of a vehicle display apparatus according to an embodiment of the present disclosure.

FIG. 6 is an exemplary block diagram of a vehicle display apparatus according to an embodiment of the present disclosure.

Referring to FIG. 6, a vehicle display apparatus 900 according to an embodiment of the present disclosure includes the signal processing device 170 and at least one display.

In the drawing, a cluster display 180a, an audio video navigation (AVN) display 180b, and network displays 180c and 180d are illustrated as the at least one display.

Meanwhile, each of the cluster display 180a and the AVN display 180b may be connected to a display port.

Meanwhile, each of the network displays 180c and 180d may be connected to a vehicle internal network through a network port. In this case, the network may be an Ethernet network based on Ethernet communication.

In the drawing, an example is illustrated in which the network displays 180c and 180d are connected to a third zonal signal processing device 170Z3 and a fourth zonal signal processing device 170Z4, respectively, but unlike the example, the network displays 180c and 180d may be connected to other zonal signal processing devices or may be connected directly to the signal processing device 170.

Meanwhile, the vehicle display apparatus 900 may further include the plurality of zonal signal processing devices 170Z1 to 170Z4.

In this case, the signal processing device 170 is a high-performance centralized signal processing and control device including a plurality of CPUs 175, GPUs 178, NPUs

179, etc., and may be referred to as a High Performance Computing (HPC) signal processing device or a central signal processing device.

The plurality of zonal signal processing devices 170Z1 to 170Z4 and the signal processing device 170 may be connected via wired cables CB1 to CB4.

Meanwhile, the plurality of zonal signal processing devices 170Z1 to 170Z4 may be connected via wired cables CBa to CBd.

In this case, the wired cables CBa to CBd may include CAN communication cable or Ethernet communication cable, or PCI Express cable.

Meanwhile, the signal processing device 170 according to an embodiment of the present disclosure may include at least one processor 175, 178, and 177, and a storage device 925 having a large capacity.

For example, the signal processing device 170 according to an embodiment of the present disclosure may include central processors 175 and 177, a graphic processor 178, and a neural processor 179.

Meanwhile, sensor data may be transmitted from at least one of the plurality of zonal signal processing devices 170Z1 to 170Z4 to the signal processing device 170. Particularly, the sensor data may be stored in the storage device 925 in the signal processing device 170.

In this case, the sensor data may include at least one of camera data, lidar data, radar data, vehicle direction data, vehicle position data (global positioning system (GPS) data), vehicle angle data, vehicle speed data, vehicle acceleration data, vehicle inclination data, vehicle forward/backward movement data, battery data, fuel data, tire data, vehicle lamp data, vehicle internal temperature data or vehicle internal humidity data.

In the drawing, an example is illustrated in which the camera data from the camera 195a and the lidar data from the lidar sensor 196 are input to a first zonal signal processing device 170Z1, and the camera data and the lidar data are transmitted to the signal processing device 170 via a second zonal signal processing device 170Z2 and a third zonal signal processing device 170Z3, and the like.

Meanwhile, data write speed or data read speed to write and read data to and from the storage device 925 is faster than a network speed when the sensor data is transmitted from at least one of the plurality of zonal signal processing devices 170Z1 to 170Z4 to the signal processing device 170, such that it is preferred to perform multi path routing so as to avoid bottlenecks in a network.

To this end, the signal processing device 170 according to an embodiment of the present disclosure may perform multi path routing based on Software Defined Network (SDN). Accordingly, stable network environment for data write and read operations may be ensured. Further, data may be transmitted to the storage device 925 by using multiple paths, such that data may be transmitted by dynamically changing a network configuration.

It is desirable that data communication between the plurality of zonal signal processing devices 170Z1 to 170Z4 and the signal processing device 170 in the vehicle display apparatus 900 according to an embodiment of the present disclosure is peripheral component interconnect express communication in order to provide high band and low delay communication.

FIG. 7 is a block diagram illustrating an example of a signal processing device according to an embodiment of the present disclosure.

Referring to FIG. 7, a signal processing system 1000 according to an embodiment of the present disclosure may include a central signal processing device 170 and a zonal signal processing device 170z.

Meanwhile, the signal processing device 170 in the system 1000 according to an embodiment of the present disclosure includes a plurality of processor cores CR1 to CRn and MR.

Meanwhile, some processor cores CR1 to CRn among the plurality of processor cores CR1 to CRn and MR may correspond to processor cores in the central processor CPU of FIG. 6.

For example, some processor cores CR1 to CRn among the plurality of processor cores CR1 to CRn and MR may correspond to application processor cores in the central processor CPU of FIG. 6.

Meanwhile, some processor cores CR1 to CRn among the plurality of processor cores CR1 to CRn and MR may operate based on the hypervisor 505, and the hypervisor 505 may execute the plurality of virtual machines 820 to 850.

Meanwhile, another processor core MR among the plurality of processor cores CR1 to CRn and MR may correspond to M core or micom unit (MCU).

Meanwhile, another processor core MR among the plurality of processor cores CR1 to CRn and MR may execute an operating system 805a corresponding to the second safety level such as ASIL D, without executing the hypervisor 505, and may execute a fourth virtual machine 840 on the operating system 805a.

Meanwhile, the fourth virtual machine 840 may execute an application corresponding to the second safety level such as ASIL D or a microservice 843 corresponding to the application corresponding to the second safety level. Accordingly, the microservice 843 or the application corresponding to the second safety level may be stably executed.

Meanwhile, a first processor core CR1 among the plurality of processor cores CR1 to CRn and MR may execute the hypervisor 505, may execute the operating system 805b, corresponding to the second safety level such as ASIL D, on the hypervisor 505, and may execute the first virtual machine 850 on the operating system 805b.

Meanwhile, the first virtual machine 850 may execute an application corresponding to the first safety level such as ASIL B or microservices 853a and 853b corresponding to the application corresponding to the first safety level. Accordingly, the microservices 853a and 853b or the application corresponding to the first level safety may be stably executed.

Meanwhile, unlike the drawing, the first processor core CR1 among the plurality of processor cores CR1 to CRn and MR may execute an operating system, corresponding to the first safety level such as ASIL B, on the hypervisor 505.

Meanwhile, the second processor core CR2 and the third processor core CR3 among the plurality of processor cores CR1 to CRn and MR may execute the hypervisor 505, may execute the operating system 805c, corresponding to the first safety level such as ASIL B, on the hypervisor 505, and may execute the second virtual machine 850 on the operating system 805c.

Meanwhile, the second virtual machine 850 may execute a third application corresponding to the first safety level such as ASIL B or microservices 833a to 833d corresponding to the third application corresponding to the first safety level. Accordingly, the microservices 833a to 833d or the application corresponding to the first safety level may be stably executed.

Meanwhile, the remaining processor cores CR4 to CRn among the plurality of processor cores CR1 to CRn and MR may execute the hypervisor 505, may execute the operating system 805d, corresponding to the third safety level such as QM, on the hypervisor 505, and may execute the third virtual machine 820 on the operating system 805d.

Meanwhile, the third virtual machine 820 may execute a fourth application corresponding to the third safety level such as QM or microservices 823a to 823d corresponding to the fourth application corresponding to the third safety level, on the operating system 805d that corresponds to the third safety level lower than the first safety level. Accordingly, the microservices 823a to 823d or the application corresponding to the third safety level may be stably executed.

Meanwhile, the zonal signal processing device 170z may include a plurality of application processor cores CRR1 to CRRm, and an M-core MRb for executing an application corresponding to the second safety level, such as ASIL D, which is the highest level of safety.

Meanwhile, some processor cores CRR1 to CRRm among the plurality of processor cores CRR1 to CRRm in the zonal signal processing device 170z may execute an operating system 806b corresponding to the first safety level such as ASIL B, and may execute the virtual machine 830b, corresponding to the first safety level, on the operating system 806a.

Meanwhile, the virtual machine 830b corresponding to the first safety level may execute the application corresponding to the first safety level such as ASIL B, or microservices 830ba to 830bd corresponding to the application corresponding to the first safety level. Accordingly, the microservices 830ba to 830bd or the application corresponding to the first safety level may be stably executed.

Meanwhile, another processor core MRb among the plurality of processor cores CRR1 to CRRm and MRb in the zonal signal processing device 170z may execute an operating system 806a corresponding to the second safety level such as ASIL D, and may execute the virtual machine 840b, corresponding to the second safety level such as ASIL D, on the operating system 806a.

Meanwhile, the virtual machine 840b corresponding to the second safety level may execute the application corresponding to the second safety level such as ASIL D, or a microservice 843b corresponding to the application corresponding to the second safety level. Accordingly, the microservice 843b or the application corresponding to the second safety level may be stably executed.

Figure 8:
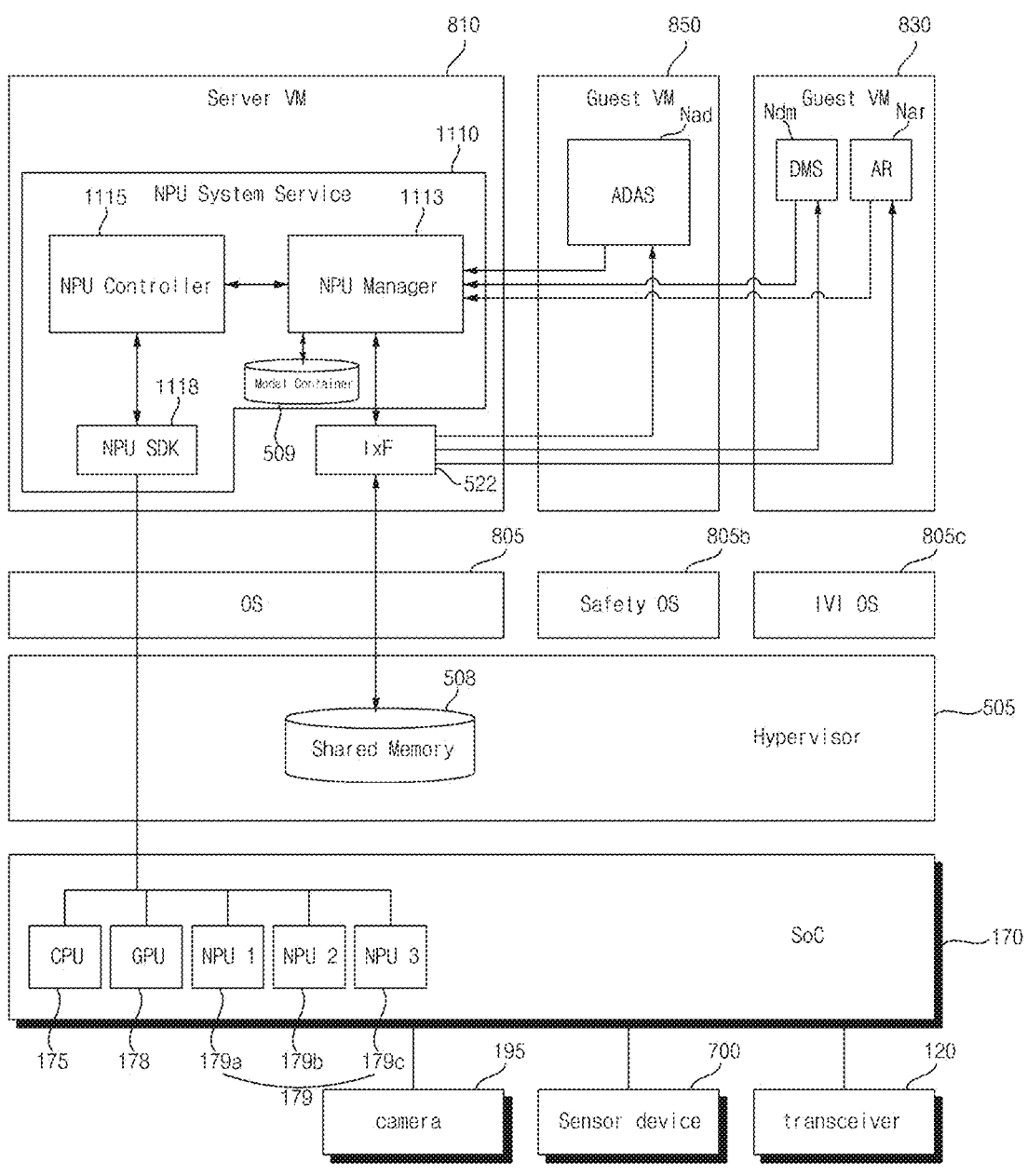
FIG. 8 is a diagram illustrating an example of a system executed in a signal processing device according to an embodiment of the present disclosure.

FIG. 8 is a diagram illustrating an example of a system executed in a signal processing device according to an embodiment of the present disclosure.

Referring to the figure, the signal processing device 170 in the signal processing system 1100 according to an embodiment of the present disclosure includes a central processor 175 and at least one neural processor 179a to 179c.

Meanwhile, the signal processing device 170 according to an embodiment of the present disclosure may further include a graphic processor 178.

Meanwhile, the central processor 175 according to an embodiment of the present disclosure executes the hypervisor 505.

Meanwhile, a system 1100 driven in the signal processing device 170 according to an embodiment of the present disclosure executes a plurality of virtual machines 810 to 850 on the hypervisor 505.

Specifically, the central processor 175 in the signal processing device 170 according to an embodiment of the present disclosure executes the hypervisor 505, and executes the plurality of virtual machines 810 to 850 on the hypervisor 505.

Meanwhile, the central processor 175 in the signal processing device 170 according to an embodiment of the present disclosure executes an application for driving a vehicle.

Meanwhile, upon determining application operation failure, the central processor 175 controls a second application, corresponding to the application, in another central processor or another signal processing device, and changes a reference fallback guarantee time for the application operation failure based on an application safety level.

Accordingly, the application for driving the vehicle may be stably executed. Particularly, the application for driving the vehicle may be stably executed based on a safety level.

Meanwhile, the signal processing device 170 according to an embodiment of the present disclosure may further include a shared memory 508.

In the drawing, an example is illustrated in which the hypervisor 505 is executed in the central processor 175, and the shared memory 508 is executed in the hypervisor 505.

Meanwhile, the signal processing device 170 according to an embodiment of the present disclosure may receive data from the camera device 195, the sensor device 700, the communication device 120, or the lidar device (not shown), and may perform signal processing by using the central processor 175, the graphic processor 178, and at least one the plurality of neural processors 179a to 179c.

Meanwhile, the sensor device 700 may continuously output sensor data to the signal processing device 170 during operation of a vehicle.

In this case, the sensor data are data from various vehicle sensor devices 700, and may include at least one of vehicle direction data, vehicle position data (global positioning system (GPS) data), vehicle angle data, vehicle speed data, vehicle acceleration data, vehicle inclination data, vehicle forward/backward movement data, battery data, fuel data, tire data, vehicle lamp data, vehicle internal temperature data, or vehicle internal humidity data.

Meanwhile, the camera device 195 may continuously output the camera data to the signal processing device 170 during vehicle operation.

Meanwhile, the lidar (not shown) may continuously output the lidar data to the signal processing device 170 during vehicle operation.

Meanwhile, the neural processor 179 may detect an object based on the camera data and may operate at a variable frame rate based on the object or may output result data including the object.

Meanwhile, the neural processor 179 may receive the camera at a fixed frame rate, may detect an object based on the camera data, and may operate at a variable frame rate based on the object or may output result data including the object.

Meanwhile, a first virtual machine 810, which is a server virtual machine, among the plurality of virtual machines 810 to 850 may control operation of the neural processor 179.

Meanwhile, each of a second virtual machine 850 and a third virtual machine 830, which are guest virtual machines, among the plurality of virtual machines 810 to 850 may execute an application.

In the drawing, an example is illustrated in which the second virtual machine 850 executes an ADAS application Nad or an autonomous driving application, and the third virtual machine 830 executes a driver monitoring system (DMS) application Ndm and an augmented reality (AR) application Nar.

While the first virtual machine 810 sequentially receives a request for a first operation, a request for a second operation, and a request for a third operation from a plurality of applications executed in at least one of the plurality of virtual machines 810 to 850, if parallel processing of the first operation and the third operation may be performed, the first virtual machine 810 controls the first neural processor 179a to perform parallel processing of the first operation and the third operation, and to process the second operation after completing the first operation and the third operation. Accordingly, the neural processor may operate efficiently. Further, power consumption may be reduced.

Meanwhile, while the first virtual machine 810 receives a request for a fourth operation after receiving the request for the third operation, if the operation layers during the second operation and the fourth operation may be shared, the first virtual machine 810 controls the first neural processor 179a to continuously process the second operation and the fourth operation after completing the first operation and the third operation. Accordingly, the neural processor may operate efficiently.

Meanwhile, upon receiving a request for a plurality of operations from a plurality of applications, the first virtual machine 810 may change the arrangement of data about the plurality of operations in an internal memory (not shown) of the first neural processor 179a. Accordingly, the neural processor may operate efficiently.

Meanwhile, the first virtual machine 810 may execute a neural system service 1110 to control at least one neural processor 179a to 179c.

Meanwhile, the upon receiving a request for a plurality of operations from a plurality of applications, the neural system service 1110 may change the arrangement of data about the plurality of operations in the internal memory (not shown) of the first neural processor 179a. Accordingly, the neural processor may operate efficiently.

Meanwhile, the neural system service 1110 may execute or include a neural manager 1113 for managing at least one neural processor 179a to 179c, a neural controller 1115 for controlling or determining an inference method of at least one neural processor 179a to 179c, and a neural interface 1118 for interfacing with at least one neural processor 179a to 179c.

Meanwhile, the neural system service 1110 may further execute or include a model container 509 for managing a model parameter interface related to operation of the neural processor 179, and versions of learning files.

The neural manager 1113 may perform artificial intelligence (AI) model management, learning model management, camera data management, sensor data management, or command queue management.

The neural controller 1115 may determine an optimal inference method of at least one neural processor 179a to 179c, or may perform queuing, partitioning, caching, or scalable coding, or may control at least one neural processor 179a to 179c.

The neural interface 1118 may execute an application program interface (API) associated with an accelerator of at least one neural processor 179a to 179c.

Meanwhile, the interface 522 in the first virtual machine 810 may perform interfacing between the neural system service 1110 and the model container 509 or between the neural system service 1110 and the shared memory 508.

Meanwhile, the interface 522 in the first virtual machine 810 may perform interfacing for the first virtual machine 810.

Meanwhile, the interface 522 in the first virtual machine 810 may perform interfacing for the ADAS application Nad executed in the second virtual machine 850, or the driver monitoring system (DMS) application Ndm or the augmented reality (AR) application Nar which is executed in the third virtual machine 830.

For example, the interface 522 in the first virtual machine 810 may be configured to transmit the camera data or the second data or the sound data to the neural processor 179 by using the shared memory 508.

Meanwhile, the interface 522 in the first virtual machine 810 may be configured to transmit result data, output from the neural processor 179 and written to the shared memory 508, to the neural system service 1110.

Meanwhile, the interface 522 in the first virtual machine 810 may be configured to transmit the result data, output from the neural processor 179 and written to the shared memory 508, to the ADAS application Nad executed in the second virtual machine 850, or the driver monitoring system (DMS) application Ndm or the augmented reality (AR) application Nar which is executed in the third virtual machine 830.

Meanwhile, the first virtual machine 810 may be executed on the first operating system 805, the second virtual machine 850 may be executed on the second operating system 805*b* having a high level of safety, and the third virtual machine 830 may be executed on the third operating system 805*c*.

That is, the plurality of virtual machines 810 to 850 may be executed on different operating systems or at least two operating systems.

Meanwhile, the neural manager 1113 may manage requirements for executing an artificial neural network-based application, may control neural network weight data, and may process required input data.

Meanwhile, the neural manager 1113 may sequentially process optimized command queues using a hardware accelerator, and may transmit an operation result to the application.

The requirements for executing the application may include operation priority, dependency, and accuracy of a neural network. The operation priority refers to a relationship in which the first operation is required to be always processed preferentially compared to the second operation, or if the neural network is a safety-critical neural network, the neural network is required to processed first before other candidate neural networks in the command queue are processed, and the operation priority is a predetermined value.

Meanwhile, the neural network weight data may refer to a stored file in which element values of each matrix are architected in the process of inferring results of a neural network calculated by performing a series of matrix operations.

The neural network weight data may be pre-stored in the model container 509 of the neural system service 1110 via an API call of the neural system service 1110 during an application installation process.

Meanwhile, base weight data loaded in the model container 509 may be automatically converted to various levels of discretization and stored during a system initialization process. For example, if the base weight is defined as FP32, the base weight may be sub-discretized to levels INT8, INT16, and FP16, such that a total of four weight files may be stored.

The required input data may refer to input signals, such as vehicle speed, current location, radar, lidar, camera image, and intermediate to final operation result values of a preceding neural network, etc., which are required for operation of a current neural network.

The input data may be transmitted in real time from the server virtual machine to the shared memory 509 in the hypervisor 505 through an interface implemented by the central processor 175.

The command queue is a memory buffer with a sequential, First In First Out (FIFO) data structure and may define a series of sequences for processing operations of an artificial neural network via a hardware accelerator.

One neural network operation request entering the command queue may be transmitted along with metadata, such as application name, location of an application virtual machine, storage destination for operation results, etc., hardware accelerator control setpoints, memory location of input data, and memory location information for each discretization level of weight data.

The hardware accelerator control setpoints may include a unique number of a hardware accelerator responsible for operations, current target discretization level (INT8, INT16, FP16, FP32, etc.) of weight data, and a mapping table in which a target neural network weight position is mapped to each address in an internal memory of the hardware accelerator.

Meanwhile, the neural controller 1115 may perform scheduling of an optimized command queue based on requested artificial neural network operation instructions and availability of current hardware resources, and may control an actual hardware accelerator according to expected operation of the command queue.

The neural controller 1115 may optimize the command queue by receiving requirements for neural network operation from the neural manager 1113.

In other words, the command queue may be optimized by checking priority, dependency, and accuracy metadata for each slot in the current command queue, and performing simulated scheduling of a combination of command queues in a direction that maximizes the use of hardware within a unit time and minimizes latency for individual operation requests, when various queue optimization methods (Partitioning, Caching, Accuracy Coding, etc.) are applied to all candidate commands in the current command queue.

A request for a weight file (learning model) may be sent to the neural manager 1113 based on the optimal slot position obtained in this manner, and the weight file may be loaded into a hardware internal memory.

By using partitioning among the optimization methods, if two neural networks are managed as one virtual neural network and input in response to a hardware operation request, start and end positions of the weight of a first operation corresponding to an address number of the hardware internal memory may be recorded in the mapping table, followed by recording start and end positions of the weight of a second operation in the mapping table.

In this manner, the hardware accelerator performs parallel processing of one virtual neural network, but the neural controller 1115 separates the operation result into results of the first operation and the second operation through the mapping table, so as to separately transmit the operation results to individual applications.

After completing the above initialization process, the neural controller 1115 may receive a request for sequentially processing command queues from the neural manager 1113.

In this case, the neural controller 1115 may retrieve input data, prepared in advance by the neural manager 1113, from an input data queue to form a pair of a neural network weight and corresponding input data, to perform operation processing through hardware accelerator API.

Unlike the initial operation requirements, in the case in which a discretization level of the current neural network is changed in specific circumstances, the neural controller 1115 may perform bitwise concatenation of a weight conversion difference value Delta of the hardware internal memory to a base weight of the current internal memory, thereby converting in real time a discretization level of the base weight of the internal memory.

Meanwhile, the central processor 175 executes an application for driving a vehicle, and upon determining application operation failure, the central processor 175 controls another central processor 175 or another signal processing device 170 to execute a second application corresponding to the application, and changes a reference fallback guarantee time for the application operation failure based on an application safety level.

Meanwhile, the above fallback guarantee time may refer to a period from a fallback start point to a fallback end point.

Alternatively, the fallback guarantee time may refer to a period from a time point at which application operation failure or application failure is determined, to a fallback end point via a fallback start point.

Meanwhile, the safety level may refer to an Automotive Safety Integrity Level (ASIL) or an autonomous driving level, or a combination of the ASIL and autonomous driving level.

Accordingly, the application for driving the vehicle may be stably executed. Particularly, the application for driving the vehicle may be stably executed based on the safety level.

Meanwhile, if a safety level of an application is a first safety level corresponding thereto, the central processor 175 may set a reference fallback guarantee time to a first time, and if a safety level of an application is a second safety level higher than the first safety level, the central processor 175 may set the reference fallback guarantee time to a second time longer than the first time. Accordingly, the application for driving the vehicle may be stably executed.

For example, the central processor 175 may set the reference fallback guarantee time to a first time of about 10 seconds for a first application corresponding to ASIL D in the case in which an autonomous driving level is a third level, and the central processor 175 may set the reference fallback guarantee time to a second time of about 30 seconds for a second application corresponding to ASIL D in the case in which an autonomous driving level is a fourth level. Accordingly, the application for driving the vehicle may be stably executed based on the safety level.

In another example, the central processor 175 may set the reference fallback guarantee time to about 7 seconds for a third application corresponding to ASIL B in the case in which an autonomous driving level is a third level, and the central processor 175 may set the reference fallback guarantee time to about 10 seconds for a fourth application corresponding to ASIL D in the case in which an autonomous driving level is a third level. Accordingly, the application for driving the vehicle may be stably executed based on the safety level.

In yet another example, in the case in which a safety level of the driver monitoring system (DMS) application Ndm is a first safety level corresponding to ASIL B, the central processor 175 may set the reference fallback guarantee time to the first time of about 10 seconds, and in the case in which a safety level of the ADAS application Nad is a second safety level corresponding to ASIL D higher than ASIL B, the central processor 175 may set the reference fallback guarantee time to the second time of about 30 seconds.

Accordingly, the application for driving the vehicle may be stably executed based on the safety level.

Meanwhile, in the case in which a safety level of an application is a third safety level lower than the first safety level, the central processor 175 may set the reference fallback guarantee time to a third time shorter than the first time. Accordingly, the application for driving the vehicle may be stably executed based on the safety level.

For example, the central processor 175 may set the reference fallback guarantee time to about 1 second for a fifth application corresponding to ASIL D or ASIL B, in the case in which an autonomous driving level is a second level.

In another example, the central processor 175 may set the reference fallback guarantee time to about 0.7 seconds for a sixth application corresponding to QM, in the case in which an autonomous driving level is a second level.

In yet another example, in the case in which a safety level of an augmented reality (AR) application Nar is a third safety level corresponding to QM lower than ASIL B, the central processor 175 may set the reference fallback guarantee time to a third time of about 0.5 seconds. Accordingly, the application for driving the vehicle may be stably executed based on the safety level.

Meanwhile, in the case in which the second virtual machine 850 among the plurality of virtual machines 810, 830, and 850 executes an application with a safety level higher than that of the third virtual machine 830, the central processor 175 may control a reference fallback guarantee time of an application executed in the second virtual machine 850 to be greater than a reference fallback guarantee time of an application executed in the third virtual machine.

For example, in the case in which the second virtual machine 850 executes a first application with an autonomous driving level being a fourth level, the central processor 175 may set the reference fallback guarantee time to about 30 seconds, and in the case in which the third virtual machine 830 executes a second application with an autonomous driving level being a third level, the central processor 175 may set the reference fallback guarantee time to about 10 seconds. Accordingly, the application for driving the vehicle may be stably executed based on the safety level.

In another example, in the case in which the second virtual machine 850 executes an ADAS application Nad corresponding to ASIL D, the central processor 175 may set the reference fallback guarantee time of the ADAS application Nad to about 30 seconds, and in the case in which the third virtual machine 830 executes a driver monitoring system (DMS) application Ndm corresponding to ASIL B, the central processor 175 may set the reference fallback guarantee time of the driver monitoring system (DMS) application Ndm to about 10 seconds. Accordingly, the application for driving the vehicle may be stably executed based on the safety level.

FIG. 9 is a block diagram illustrating another example of a vehicle display apparatus according to an embodiment of the present disclosure.

Referring to FIG. 9, a signal processing system 1200 in a vehicle display apparatus according to an embodiment of the present disclosure may include a first central signal processing device 170a1 and a second central signal processing device 170a2.

Meanwhile, the first central signal processing device 170a1 may be a primary signal processing device, and the second central signal processing device 170a2 may be a secondary signal processing device.

That is, in response to determination that a failure occurs in the first central signal processing device 170*a*l, the second central signal processing device 170*a*2 may operate as a fallback.

In this case, the first central signal processing device 170*a*1 may correspond to the central signal processing device 170 of FIG. 8.

Meanwhile, similarly to the central signal processing device 170 of FIG. 8, the second central signal processing device 170*a*2 includes a central processor 175*b* and at least one neural processor 179*b*.

Meanwhile, the second central signal processing device 170*a*2 according to an embodiment of the present disclosure may further include a graphic processor 178*b*.

Meanwhile, the central processor 175*b* according to an embodiment of the present disclosure may execute a hypervisor 505*b*.

Meanwhile, a system 1100*b* that operates in the second central signal processing device 170*a*2 according to an embodiment of the present disclosure may execute a plurality of virtual machines 810*b* to 850*b* on the hypervisor 505*b*.

Specifically, the central processor 175*b* in the second central signal processing device 170*a*2 according to an embodiment of the present disclosure may execute the hypervisor 505*b* and may execute the plurality of virtual machines 810*b* to 850*b* on the hypervisor 505*b*.

Meanwhile, a first virtual machine 810*b*, which is a server virtual machine, among the plurality of virtual machines 810*b* to 850*b* may control operation of the neural processor 179*b*.

Meanwhile, a second virtual machine 850*b* and a third virtual machine 830*b*, which are guest virtual machines, among the plurality of virtual machines 810*b* to 850*b*, may each execute an application.

In the drawing, an example is illustrated in which the second virtual machine 850*b* executes an ADAS application Nadb, and the third virtual machine 830 executes a driver monitoring system (DMS) application Ndmb and an augmented reality (AR) application Narb.

Meanwhile, the first virtual machine 810*b* may execute a neural system service 1110*b* for controlling at least one neural processor 179*b*.

Meanwhile, the neural system service 1110*b* may execute or include a neural manager 1113*b* for managing at least one neural processor 179*b*, a neural controller 1115*b* for determining or controlling an inference method of at least one neural processor 179*b*, and a neural interface 1118*b* for interfacing with at least one neural processor 179*b*.

Meanwhile, the neural system service 1110*b* may further execute or include a model container 509*b* for managing a model parameter interface related to operation of the neural processor 179*b*, and versions of learning files.

For example, in response to determination that an operation failure or fault occurs during execution of the ADAS application Nad in the first central signal processing device 170*a*l, the second central signal processing device 170*a*2 may execute, as a fallback operation, a second ADAS application Nadb corresponding to the ADAS application Nad. Accordingly, the application for driving the vehicle may be stably executed.

In another example, in response to determination that an operation failure or fault occurs during execution of the autonomous driving application in the first central signal processing device 170*a*l, the second central signal processing device 170*a*2 may execute, as a fallback operation, a second autonomous driving application corresponding to the autonomous driving application. Accordingly, the application for driving the vehicle may be stably executed.

In yet another example, in response to determination that an operation failure or fault occurs during execution of the driver monitoring system (DMS) application Ndm in the first central signal processing device 170*a*, the second central signal processing device 170*a*2 may execute, as a fallback operation, a second driver monitoring system (DMS) application Ndmb corresponding to the driver monitoring system (DMS) application Ndm. Accordingly, the application for driving the vehicle may be stably executed.

Meanwhile, it is desirable that a reference fallback guarantee time when the first central signal processing device 170*a*1 executes the ADAS application Nad is greater than a reference fallback guarantee time when the first central signal processing device 170*a*l executes the driver monitoring system (DMS) application Ndm.

Particularly, in the case in which a safety level of the ADAS application Nad is higher than a safety level of the driver monitoring system (DMS) application Ndm, it is desirable that a reference fallback guarantee time when the ADAS application Nad is executed is greater than a reference fallback guarantee time when the driver monitoring system (DMS) application Ndm is executed. Accordingly, the application for driving the vehicle may be stably executed based on the safety level.

FIG. 10 is a flowchart illustrating a method of operating a vehicle display apparatus according to an embodiment of the present disclosure.

Referring to FIG. 10, the central processor 175 in the signal processing device 170 may be configured to execute an application for driving a vehicle (S1010).

Meanwhile, the central processor 175 in the signal processing device 170 may be configured to calculate a fallback guarantee time, corresponding to an estimated fallback time, based on sensor data or camera data of a vehicle or an operating state of the signal processing device (S1015).

For example, the central processor 175 may be configured to calculate the fallback guarantee time based on at least one of temperature of a system, performance based on the safety level, an error history of the system, latency of the application or workload of the system.

Specifically, the neural processor 179 may be configured to perform neural processing based on at least one of the temperature of the system, the performance based on the safety level, the error history of the system, the latency of the application or the workload of the system, and calculate the fallback guarantee time based on the neural processing. Accordingly, the application for driving the vehicle may be stably executed.

Meanwhile, the central processor 175 in the signal processing device 170 may be configured to determine whether an application operation has failed (S1020), and if so, the central processor 175 may be configured to compare a calculated fallback guarantee time with a reference fallback guarantee time (S1025). If the calculated fallback guarantee time is less than the reference fallback guarantee time, the central processor 175 may be configured to perform a fallback operation (S1030).

For example, if the calculated fallback guarantee time is less than the reference fallback guarantee time, the central processor 175 in the signal processing device 170 may be configured to perform one of a plurality of fallback operations.

In this case, the plurality of fallback operations may include Driver Takeover request, Blind Brake, Lane Keeping & Blind Braking, Emergency lane change & braking, Pull over on the shoulder, or long distance route planning.

Meanwhile, if the calculated fallback guarantee time is greater than or equal to the reference fallback guarantee time in operation 1025 (S1025), the central processor 175 may be configured to perform a predetermined operation (S1035).

Meanwhile, if the calculated fallback guarantee time is greater than or equal to the reference fallback guarantee time, the central processor 175 may be configured to perform a predetermined fail operation. In this case, it is desirable that an appropriate fail operation is performed.

For example, if the calculated fallback guarantee time is less than the reference fallback guarantee time, the central processor 175 may be configured to execute a second application, corresponding to the application, in another central processor 175 or another signal processing device 170. Accordingly, the application for driving the vehicle may be stably executed.

Meanwhile, in a state in which a calculated fallback guarantee time is greater than the reference fallback guarantee time and the calculated fallback guarantee time is reduced, as a difference between the calculated estimated reference fallback guarantee time and the reference fallback guarantee time decreases, the central processor 175 may be configured to restrict execution of an application with a higher safety level.

For example, when the calculated fallback guarantee time is greater than or equal to the reference fallback guarantee time, if a difference between the calculated estimated reference fallback guarantee time and the reference fallback guarantee time is a first time, the central processor 175 may be configured to execute an application corresponding to a first safety level; and if a difference between the calculated estimated reference fallback guarantee time and the reference fallback guarantee time is a second time greater than the first time, the central processor 175 may be configured to execute an application corresponding to a second safety level higher than the first safety level.

That is, when the calculated fallback guarantee time is greater than or equal to the reference fallback guarantee time, if the difference between the calculated estimated reference fallback guarantee time and the reference fallback guarantee time is the second time greater than the first time, the central processor 175 may be configured to execute the application corresponding to the second safety level higher than the first safety level; and if the difference between the calculated estimated reference fallback guarantee time and the reference fallback guarantee time is the first time, the central processor 175 may restrict execution of an application corresponding to the second safety level, and instead control an application corresponding to the first safety level to be performed.

Specifically, if the difference between the calculated estimated reference fallback guarantee time and the reference fallback guarantee time is the first time, the central processor 175 may be configured to execute the driver monitoring system (DMS) application Ndm corresponding to the first safety level; and if the difference between the calculated estimated reference fallback guarantee time and the reference fallback guarantee time is the second time greater than the first time, the central processor 175 may be configured to execute the ADAS application Nad, having a safety level higher than that of the driver monitoring system (DMS) application Ndm. Accordingly, the application for driving the vehicle may be stably executed based on the safety level.

Meanwhile, the central processor 175 may be configured to change the reference fallback guarantee time based on a driving environment of a vehicle.

For example, the central processor 175 may be configured to increase the reference fallback guarantee time as a driving distance of the vehicle increases.

In another example, the central processor 175 may be configured to increase the reference fallback guarantee time as the number of times vehicle parts are repaired increases. Accordingly, the application may be stably executed according to vehicle status.

Meanwhile, unlike the drawing, the central processor 175 in the signal processing device 170 may be configured to perform learning on a correctable failure based on sensor data or camera data of a vehicle or an operating state of the signal processing device and may perform proactive control based on the learning, between operation 1010 (S1010) and operation 1015 (S1015).

That is, the central processor 175 in the signal processing device 170 may be configured to perform learning on a correctable failure while executing an application, and may perform proactive control based on the learning before an operation failure or fault occurs in the application.

In this case, the proactive control may include changing a movable path in consideration of a safety zone, or limiting an autonomous driving level according to a failure precursor corresponding to a correctable failure and displaying the failure precursor on a display, and the like.

Meanwhile, while performing proactive control, the central processor 175 in the signal processing device 170 may be configured to change the strength of proactive control according to a safety level.

For example, in the case in which the autonomous driving level is level 4 during proactive control, the central processor 175 in the signal processing device 170 may be configured to control the strength of proactive control to be greater than the case in which the autonomous driving level is level 3. Accordingly, stable control may be achieved.

Meanwhile, in response to determination as in operation 1020 (S1020) that an operation failure or fault occurs during execution of an application even when performing proactive control and the like, the central processor 175 in the signal processing device 170 may be configured to perform a fallback operation based on a result of comparison between a calculated fallback entry time and a reference fallback entry time. Accordingly, an application for driving the vehicle may be stably executed.

FIGS. 11 to 13 are diagrams referred to in the description of operation of FIG. 9 or FIG. 10.

FIG. 11 is a diagram illustrating an example of calculating a fallback guarantee time using a neural network.

Referring to FIG. 11, the neural processor 179 may calculate a fallback guarantee time by using a neural network 1220.

Meanwhile, the neural processor 179 may be configured to set, as an input layer, hardware monitoring information 1203 of the signal processing device 170, vehicle status information 1207, and system information 1209 of the signal processing device, and calculate a fallback guarantee time by using a neural network.

Meanwhile, the hardware monitoring information 1203 of the signal processing device 170 may include temperature information 1204 of a system in the signal processing device 170 and performance information 1205 based on a safety level.

Meanwhile, the vehicle status information 1207 may include vehicle error repair history information 1208, system error history information, and the like.

Meanwhile, the system information 1209 of the signal processing device may include system error history 1211, application latency information 1213, system workload information 1214, and the like.

That is, the neural processor 179 may be configured to perform neural processing based on at least one of system temperature, performance based on the safety level, system error history, application latency or system workload, and output result data based on the neural processing.

In this case, the result data may include a calculated fallback guarantee time 1223 and power data or temperature data 1224.

Meanwhile, the neural processor 179 may be configured to perform neural processing based on a feedback on power data or temperature data in the result data of the neural processing. Accordingly, the application for driving the vehicle may be stably executed.

Meanwhile, the neural network may include a state-of-the-art neural network for efficient learning.

For example, the neural network may include Deep Neural Network (DNN), Convolutional Neural Network (CNN), Recurrent Neural Network (RNN), Federated learning, or Transformer-based Neural Network using self-attention.

Meanwhile, a neural network model may be configured to change based on driving distance and driving history of a vehicle, repair or part replacement history, application update, hardware update, and the like.

Alternatively, the neural processor 179 may be configured to calculate a fallback guarantee time based on driving distance and driving history of a vehicle, repair or part replacement history, application update, hardware update, and the like.

FIG. 12 is a diagram referred to in the description of operation of a fail operation manager based on the calculated fallback guarantee time of FIG. 11.

Referring to FIG. 12, a fail operation manager 819 may be configured to operate based on the calculated fallback guarantee time 1223.

The fail operation manager 819 may be configured to perform a fallback operation Sfa or a fail operation Sop based on a result of comparison between the calculated fallback guarantee time and the reference fallback guarantee time.

For example, if the calculated fallback guarantee time is less than the reference fallback guarantee time, the fail operation manager 819 may be configured to perform one of a plurality of fallback operations.

In another example, if the calculated fallback guarantee time is greater than or equal to the reference fallback guarantee time, the fail operation manager 819 may be configured to perform the predetermined fail operation Sop.

Meanwhile, for performing the fail operation, the fail operation manager 819 may be configured to perform one operation Sop among a plurality of fail operations, based further on Non-corrected Failure 1302, autonomous driving level (SAE Level) 1305, vehicle driving status 1307, or driving application 1304, etc., in addition to the calculated fallback guarantee time and the reference fallback guarantee time.

FIG. 13 is a diagram illustrating a plurality of fallback operations.

Referring to FIG. 13, if the calculated fallback guarantee time is less than the reference fallback guarantee time, the central processor 175 may be configured to perform one of a plurality of fallback operations.

In this case, the plurality of fallback operations may include Driver Takeover request, Blind Brake S0, Lane Keeping and Blind Braking S1, Emergency lane change and braking S2, Pull over on the shoulder, or long distance route planning, and the like. Accordingly, the application for driving the vehicle may be stably executed.

Meanwhile, the central processor 175 in the signal processing device 170 according to another embodiment of the present disclosure may be configured to change a reference fallback guarantee time for an operation failure of the application based on a safety level of the application, and upon determining that an operation failure occurs in the application based on the reference fallback guarantee time and the calculated fallback guarantee time, the central processor 175 may be configured to perform a fallback operation or a fail operation. Accordingly, the application for driving the vehicle may be stably executed. Particularly, the application for driving the vehicle may be stably executed based on the safety level.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising:

at least one neural processor; and a central processor configured to execute an application for driving a vehicle, wherein the central processor is configured to:

in response to determination of operation failure of the application, execute a second application, corresponding to the application, in a second central processor or a second signal processing device, and based on a safety level of the application, change a reference fallback guarantee time for the operation failure of the application, wherein the central processor is configured to execute a hypervisor and a plurality of virtual machines on the hypervisor, wherein a first virtual machine among the plurality of virtual machines is configured to execute a neural system service for controlling the neural processor, and wherein in response to a second virtual machine among the plurality of virtual machines executing an application with a higher safety level than a third virtual machine among the plurality of virtual machines, the central processor is configured to control a reference fallback guarantee time of the application executed in the second virtual machine to be greater than a reference fallback guarantee time of the application executed in the third virtual machine.

2. The signal processing device of claim 1, wherein the central processor is configured to:

in response to the safety level of the application being a first safety level, set the reference fallback guarantee time to a first time; and in response to the safety level of the application being a second safety level higher than the first safety level, set the reference fallback guarantee time to a second time longer than the first time.

3. The signal processing device of claim 2, wherein in response to the safety level of the application being a third safety level lower than the first safety level, the central processor is configured to set the reference fallback guarantee time to a third time shorter than the first time.

4. The signal processing device of claim 1, wherein in response to a calculated fallback guarantee time being greater than or equal to the reference fallback guarantee time, the central processor is configured to perform a predetermined operation.

5. The signal processing device of claim 1, wherein in response to a calculated fallback guarantee time being less than the reference fallback guarantee time, the central processor is configured to execute the second application, corresponding to the application, in the second central processor or the second signal processing device.

6. The signal processing device of claim 1, wherein in response to a calculated fallback guarantee time being less than the reference fallback guarantee time, the central processor is configured to perform a fallback operation.

7. The signal processing device of claim 1, wherein in response to a calculated fallback guarantee time being less than the reference fallback guarantee time, the central processor is configured to perform one of a plurality of fallback operations.

8. The signal processing device of claim 7, wherein the plurality of fallback operations comprise driver takeover request, blind brake, Lane Keeping and Blind Braking, Emergency lane change and braking, Pull over on a shoulder, or long distance route planning.

9. The signal processing device of claim 1, wherein in a state in which a calculated fallback guarantee time is greater than the reference fallback guarantee time and the calculated fallback guarantee time is reduced, as a difference between a calculated estimated reference fallback guarantee time and the reference fallback guarantee time decreases, the central processor is configured to restrict execution of an application with a higher safety level.

10. The signal processing device of claim 1, wherein the central processor is configured to:
   in response to a difference between a calculated estimated reference fallback guarantee time and the reference fallback guarantee time being a first time, execute an application corresponding to a first safety level; and
   in response to a difference between the calculated estimated reference fallback guarantee time and the reference fallback guarantee time being a second time greater than the first time, execute an application corresponding to a second safety level higher than the first safety level.

11. The signal processing device of claim 1, wherein the central processor is configured to change the reference fallback guarantee time based on a driving environment of the vehicle.

12. The signal processing device of claim 1, wherein the central processor is configured to calculate a fallback guarantee time based on at least one of temperature of a system, performance based on the safety level, an error history of the system, latency of the application or workload of the system.

13. The signal processing device of claim 1, wherein the neural processor is configured to perform neural processing based on at least one of temperature of a system, performance based on the safety level, error history of the system, latency of the application or workload of the system, and to calculate a fallback guarantee time based on the neural processing.

14. The signal processing device of claim 13, wherein the neural processor is configured to perform neural processing based on a feedback on power data or temperature data in result data of the neural processing.

15. The signal processing device of claim 1, wherein the second virtual machine among the plurality of virtual machines is configured to execute an Advanced Driver Assistance Systems (ADAS) application, and
   wherein the third virtual machine among the plurality of virtual machines is configured to execute a driver monitoring system (DMS) application or an augmented reality (AR) application.

16. A signal processing device comprising a central processor configured to execute an application for driving a vehicle,
   wherein the central processor is configured to:
   change a reference fallback guarantee time for an operation failure of the application based on a safety level of the application, and
   in response to determination of operation failure of the application based on the reference fallback guarantee time and a calculated fallback guarantee time, perform a fallback operation or a fail operation,
   wherein the central processor is configured to execute a hypervisor and a plurality of virtual machines on the hypervisor,
   wherein a first virtual machine among the plurality of virtual machines is configured to execute a neural system service for controlling a neural processor, and
   wherein in response to a second virtual machine among the plurality of virtual machines executing an application with a higher safety level than a third virtual machine among the plurality of virtual machines, the central processor is configured to control a reference fallback guarantee time of the application executed in the second virtual machine to be greater than a reference fallback guarantee time of the application executed in the third virtual machine.

17. A vehicle display apparatus comprising:
   at least one display; and
   a signal processing device configured to output an image signal to the at least one display,
   wherein the signal processing device comprises:
   at least one neural processor; and
   a central processor configured to execute an application for driving a vehicle,
   wherein the central processor is configured to:
   in response to determination of operation failure of the application, execute a second application, corresponding to the application, in a second central processor or a second signal processing device, and
   based on a safety level of the application, change a reference fallback guarantee time for the operation failure of the application,
   wherein the central processor is configured to execute a hypervisor and a plurality of virtual machines on the hypervisor,
   wherein a first virtual machine among the plurality of virtual machines is configured to execute a neural system service for controlling the neural processor, and
   wherein in response to a second virtual machine among the plurality of virtual machines executing an application with a higher safety level than a third virtual machine among the plurality of virtual machines, the central processor is configured to control a reference fallback guarantee time of the application executed in the second virtual machine to be greater than a reference fallback guarantee time of the application executed in the third virtual machine.

18. The vehicle display apparatus of claim 17, wherein the central processor is configured to:

in response to the safety level of the application being a first safety level, set the reference fallback guarantee time to a first time; and in response to the safety level of the application being a second safety level higher than the first safety level, set the reference fallback guarantee time to a second time longer than the first time.

* * * * *